(12) United States Patent
Masuda

(10) Patent No.: US 10,147,400 B2
(45) Date of Patent: Dec. 4, 2018

(54) DISPLAY CONTROL DEVICE, DISPLAY CONTROL METHOD, AND DISPLAY CONTROL PROGRAM

(71) Applicant: NIPPON TELEGRAPH AND TELEPHONE CORPORATION, Chiyoda-ku (JP)

(72) Inventor: Takeshi Masuda, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/508,402

(22) PCT Filed: Sep. 4, 2015

(86) PCT No.: PCT/JP2015/075251
§ 371 (c)(1),
(2) Date: Mar. 2, 2017

(87) PCT Pub. No.: WO2016/039273
PCT Pub. Date: Mar. 17, 2016

(65) Prior Publication Data
US 2017/0287444 A1    Oct. 5, 2017

(30) Foreign Application Priority Data

Sep. 8, 2014 (JP) ................................. 2014-182577

(51) Int. Cl.
*G09G 5/377* (2006.01)
*G06K 9/32* (2006.01)
(Continued)

(52) U.S. Cl.
CPC ........... *G09G 5/377* (2013.01); *G06F 3/0485* (2013.01); *G06F 3/04817* (2013.01);
(Continued)

(58) Field of Classification Search
CPC .......... G09G 5/377; G09G 5/397; G09G 5/40; G09G 2340/12; G09G 2340/125;
(Continued)

(56) References Cited

U.S. PATENT DOCUMENTS

2011/0125735 A1   5/2011  Petrou
2011/0164163 A1*  7/2011  Bilbrey ................. G06F 1/1694
                                                           348/333.01
(Continued)

FOREIGN PATENT DOCUMENTS

JP       2004-171490 A    6/2004
JP        2007-58677 A    3/2007
(Continued)

OTHER PUBLICATIONS

Japanese Office Action dated Jul. 11, 2017 in Japanese Patent Application No. 2016-547420 (with unedited computer generated English translation).

(Continued)

*Primary Examiner* — Jeffery A Brier
(74) *Attorney, Agent, or Firm* — Oblon, McClelland, Maier & Neustadt, L.L.P.

(57) ABSTRACT

A display control device (10) detects change of a screen, and executes, depending on the detected change of the screen, any one or both of provisional update processing that generates a strip-shaped rectangular region extended in a vertical direction or a horizontal direction based on the position of an icon displayed on the screen, searches the screen for a region similar to a specified image template by using the rectangular region as a search range, and performs overlay display of an icon in the similar region, and definitive update processing that searches for a region similar to the image template by using a region larger than a search range of the provisional update processing as a search range, (Continued)

and performs overlay display of an icon at a position corresponding to the similar region.

10 Claims, 27 Drawing Sheets

(51) Int. Cl.
    *G06F 3/0481*     (2013.01)
    *G06K 9/62*     (2006.01)
    *G06F 3/0485*     (2013.01)
    *G09G 5/34*     (2006.01)

(52) U.S. Cl.
    CPC ......... *G06K 9/3266* (2013.01); *G06K 9/6215* (2013.01); *G09G 5/346* (2013.01); *G09G 2310/04* (2013.01); *G09G 2340/125* (2013.01); *G09G 2360/121* (2013.01)

(58) Field of Classification Search
    CPC .. G09G 5/34; G06T 11/60; G06T 3/20; G06F 3/0485
    See application file for complete search history.

(56) References Cited

U.S. PATENT DOCUMENTS

| 2015/0149900 | A1 | 5/2015 | Kawabata | |
|---|---|---|---|---|
| 2016/0042250 | A1* | 2/2016 | Cordova-Diba | ......... G06T 5/00 |
| | | | | 382/180 |

FOREIGN PATENT DOCUMENTS

| JP | 2013-501975 A | 1/2013 |
|---|---|---|
| WO | 2014/002812 A1 | 1/2014 |

OTHER PUBLICATIONS

T. Yeh, et al., "Creating Contextual Help for GUIs Using Screenshots," Paper Session: Social Learning, UIST'11, Oct. 16-19, 2011, pp. 145-154.

International Search Report dated Nov. 24, 2015 in PCT/JP2015/075251 filed Sep. 4, 2015.

* cited by examiner

FIG.4A
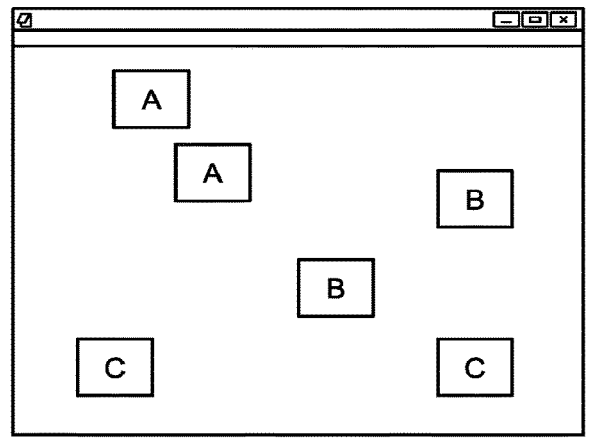
FIG.4B
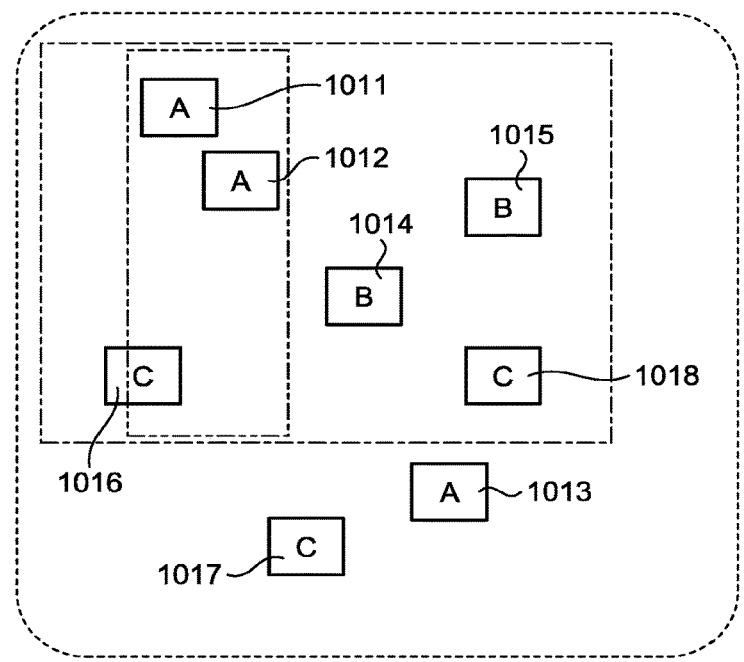
FIG.4C

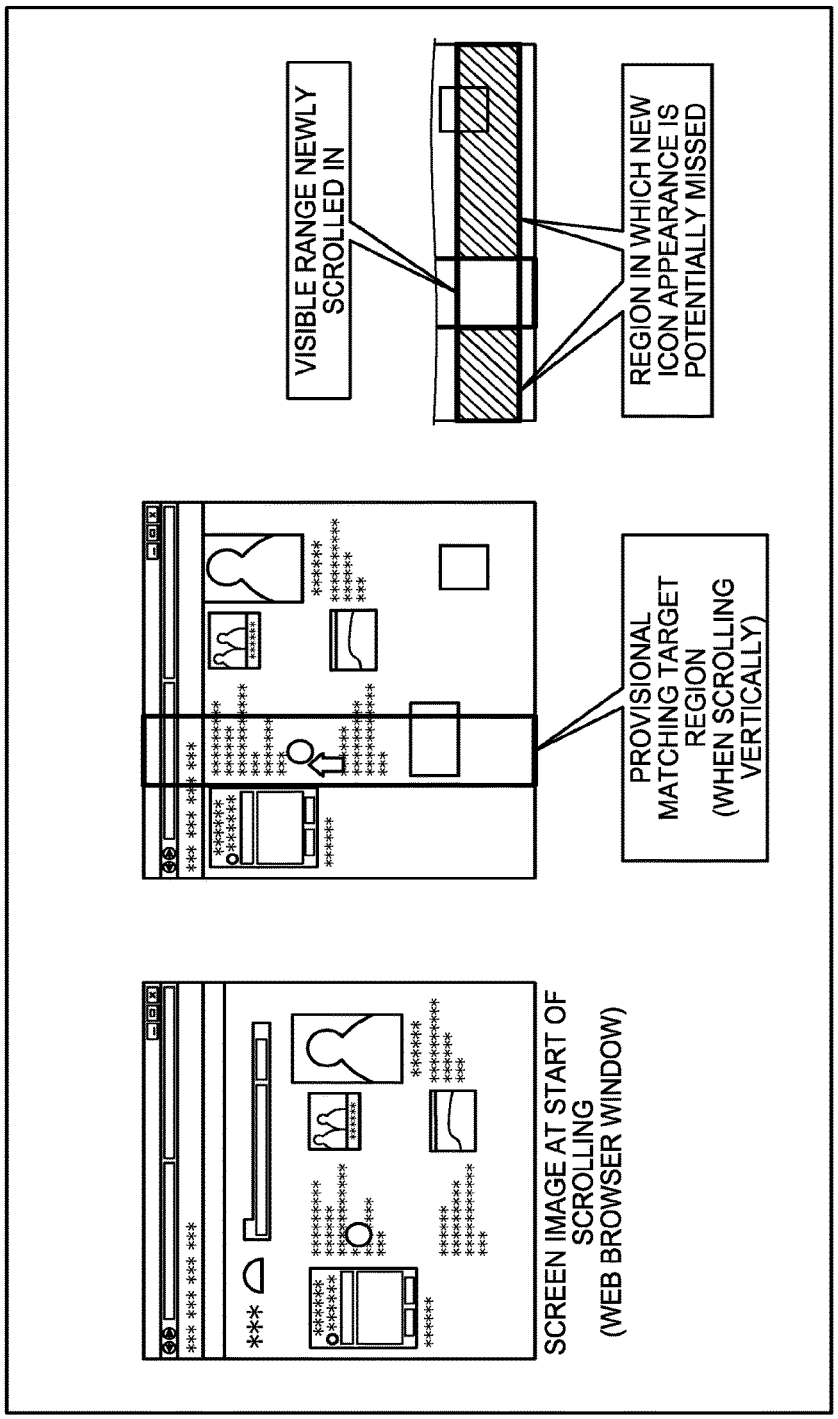

FIG.24

```
0001        for (int i_m = 0; i_m < M_width; i_m++) {
0002         for (int j_m = 0; j_m < M_height; j_m++) {
0003          boolean found = true;
0004          for (int i_n = 0; i_n < N_width; i_n++) {
0005           for (int j_n = 0; j_n < N_height; j_n++) {
0006            if (Pm[i_m+i_n][j_m+j_n] != Pn[i_n][j_n]) {
0007             i_n = N_width;
0008             j_n = N_height;
0009             found = false;
0010            }
0011           }
0012          }
0013          if (found == true) {
0014           // MATCHING POSITION FOUND
0015          }
0016         }
0017        }
```

DISPLAY CONTROL DEVICE, DISPLAY CONTROL METHOD, AND DISPLAY CONTROL PROGRAM

FIELD

The present invention relates to a display control device, a display control method, and a display control program.

BACKGROUND

Conventionally, an annotation technology of providing visual interpretation content to a user by overlay display when the user uses an application has been known. For example, when the annotation technology is applied to real-time video, overlay display of an interpretation result at each moment is performed and updated in synchronization with change or motion as an interpretation target, and the original video and interpretation thereof are simultaneously presented to the user. In this manner, the user can be supported with information by integrally presenting the target and the interpretation to the user without changing the original video.

A specific application in this field is an annotation system (for example, refer to Patent Literature 1). The system continuously captures images of a screen of a PC to search the screen for a region similar to a specified image template, and performs overlay display of an icon at an obtained position.

In this example, a plurality of rules that are each a set of an image template and a short message corresponding thereto are manually defined in advance. Image template matching with these rule sets is performed on a capture image at each moment to calculate a position at which an icon is to be displayed. This processing corresponds to processing of image content interpretation. Annotation to a particular button or a text field on the window of a system AP or addition of hint information to a particular icon or string on each row of a displayed table can be achieved through overlay display of interpretation content on the screen of a PC being operated by a person.

CITATION LIST

Patent Literature

Patent Literature 1: International Publication Pamphlet No. WO 2014/002812

SUMMARY

Technical Problem

However, in the conventional annotation system, image template matching is performed, and thus a processing load is high and a processing time is long when the area of an application target image is large or when screen change is large, preventing fast screen update processing, which is a problem.

Thus, it is known that typically in the annotation system employing image template matching, a calculation time becomes longer as the area of an application target image increases. This problem can be solved by, for example, performing annotation display calculation only for an active window region, but in a case of a large window size or a web browser the inside of which is entirely scrolled, for example, unnatural motion as in frame-by-frame playback occurs despite use of a recent high-performance PC.

For example, in a scene of practical use of the annotation system, more than thirty rules are defined and applied to one window in some cases. The number of times of image matching calculation executed for a frame image is one per rule, calculation time increases in proportion to the number of rules. Thus, when a practical rule set is used, the calculation time easily reaches such a level that real-time processing cannot keep up.

In addition, for example, in a web browser, only part of rules that matches with an image content made visible by scrolling is applied, and most of the rules are scrolled out of a visual field and are irrelevant. However, whether these rules are relevant can be determined on the basis of only on whether a matching position is found by actually performing image matching. Thus, when only several icons are displayed to the user, a potentially large number of rules need to be evaluated and calculated for each frame.

When the above-described factors happen at the same time, for example, update for one frame takes 5 to 10 seconds when not a large number of icons are displayed or an apparently large amount of information is displayed, and the user needs to wait for such an unrealistic time duration for practical use in some cases. Processing of any background image proceeds in parallel and asynchronously with the update in real time, and thus overlay display cannot keep up with a changing screen. During this time, the overlay display disappears or is left at an original position, and moreover, the overlay display is updated only when a sufficient time has elapsed since the screen being operated stops.

Solution to Problem

A display control device includes: a detection unit configured to detect change of a screen; and a display control unit configured to execute, depending on change of the screen detected by the detection unit, any one or both of provisional update processing that generates predetermined matching result information based on a result of calculation on a previous frame displayed on the screen, searches the screen for a region similar to a specified image template by using the predetermined matching result information as part of a matching condition for a next frame, and performs overlay display of an icon in the similar region, and definitive update processing that searches for a region similar to the image template by using a matching condition larger than the predetermined matching result information, and performs overlay display of an icon at a position corresponding to the similar region.

A display control method executed by a display control device, the display control method includes: a detection process of detecting change of a screen; and a display control process of, depending on the change of the screen detected at the detection process, executing any one or both of provisional update processing that generates predetermined matching result information based on a result of calculation on a previous frame displayed on the screen, searches the screen for a region similar to a specified image template by using the predetermined matching result information as part of a matching condition for a next frame, and performs overlay display of an icon in the similar region, and definitive update processing that searches for a region similar to the image template by using a matching condition larger than the predetermined matching result information, and performs overlay display of an icon at a position corresponding to the similar region.

A display control program configured to cause a computer to execute: the program includes: a detection step of detecting change of a screen; and a display control step of executing, depending on the change of the screen detected at the detection step, any one or both of provisional update processing that generates predetermined matching result information based on a result of calculation on a previous frame displayed on the screen, searches the screen for a region similar to a specified image template by using the predetermined matching result information as part of a matching condition for a next frame, and performs overlay display of an icon in the similar region, and definitive update processing that searches for a region similar to the image template by using a matching condition larger than the predetermined matching result information, and performs overlay display of an icon at a position corresponding to the similar region.

Advantageous Effects of Invention

The present invention can perform fast screen update processing by reducing a processing load to shorten a processing time.

BRIEF DESCRIPTION OF DRAWINGS

FIG. 4A is a diagram for describing overlay display.

FIG. 4B is a diagram for describing the overlay display.

FIG. 4C is a diagram for describing the overlay display.

FIG. 5 is a diagram for describing a case in which missed detection occurs in provisional update.

FIG. 24 is a diagram illustrating an exemplary pseudo code of a computer program that executes the pixel comparison processing.

DESCRIPTION OF EMBODIMENTS

Embodiments of a display control device, a display control method, and a display control program according to the present application will be described in detail below with reference to the accompanying drawings. These embodiments do not limit the display control device, the display control method, and the display control program according to the present application.

First Embodiment

An embodiment below sequentially describes the configuration of a display control device according to a first embodiment and the process of processing at the display control device, and describes effects of the first embodiment in the end. The following description will be made on display control of annotation as an exemplary application, but the present invention is not limited to annotation.

[Configuration of Display Control Device According to First Embodiment]

Figure 1:
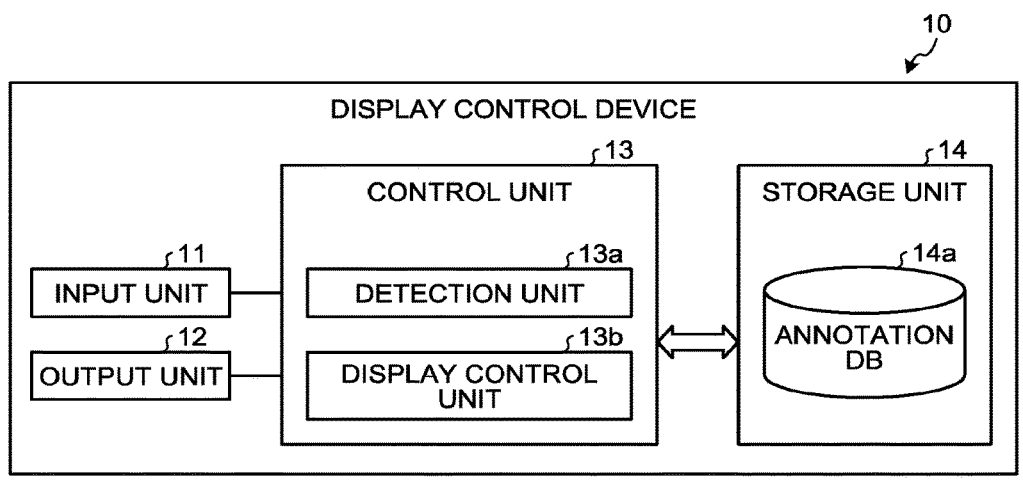
FIG. 1 is a schematic configuration diagram illustrating the entire configuration of a display control device according to a first embodiment.

The following first describes a display control device 10 according to the first embodiment with reference to FIG. 1. FIG. 1 is a schematic configuration diagram illustrating the entire configuration of the display control device 10 according to the first embodiment. As illustrated in FIG. 1, the display control device 10 includes an input unit 11, an output unit 12, a control unit 13, and a storage unit 14.

The input unit 11 receives, for example, an instruction to scroll a screen and an instruction to select an active window, and includes a keyboard, a mouse, and the like. The output unit 12 displays a screen, and includes a display, a speaker, and the like.

The storage unit 14 stores therein data and a computer program necessary for various kinds of processing executed by the control unit 13. In particular, the storage unit 14 stores therein an annotation database (DB) 14a as a component closely related to the present invention. The storage unit 14 is, for example, a semiconductor memory element such as a random access memory (RAM) or a flash memory, or a storage device such as a hard disk or an optical disk. The annotation DB 14a stores therein, for example, a plurality of annotation rules produced for each window on which an annotation text is to be displayed.

The control unit 13 includes an internal memory storing therein a computer program that defines, for example, various processing procedures, and necessary data, for executing various kinds of processing. In particular, the control unit 13 includes a detection unit 13a and a display control unit 13b as components closely related to the present invention.

The detection unit 13a detects change of a screen displayed at the output unit 12. Specifically, the detection unit 13a detects progress and stop of change of the screen.

In response to the change of the screen detected by the detection unit 13a, the display control unit 13b executes any one or both of provisional update processing that generates predetermined matching result information on the basis of a result of calculation on the previous frame displayed on the screen, searches the screen for a region similar to a specified image template by using the predetermined matching result information as part of a matching condition for the next frame, and performs overlay display of an icon in the similar region, and definitive update processing that searches for a region similar to the image template by using a matching condition larger than the predetermined matching result information, and performs overlay display of an icon at a position corresponding to the similar region.

Specifically, in response to the change of the screen detected by the detection unit 13a, the display control unit 13b executes any one or both of provisional update processing that generates a predetermined region on the basis of the position of an icon displayed on the screen (for example, a strip-shaped rectangular region extended in the vertical direction or the horizontal direction on the basis of the position of the icon), searches the screen for a region similar to a specified image template by using the rectangular region as a search range, and performs overlay display of an icon in the similar region, and definitive update processing that searches for a region similar to the image template by using a region larger than the rectangular region as a search range, and performs overlay display of an icon at a position corresponding to the similar region.

The display control unit 13b executes provisional update when progress of change of the screen is detected by the detection unit 13a, and executes definitive update when stop of change of the screen is detected by the detection unit 13a.

For example, in the provisional update processing, the display control unit 13b generates a strip-shaped rectangle extended in the vertical direction or the horizontal direction on the basis of the position of an already displayed icon as a simple calculation method referring to the previous frame. The display control unit 13b calculates image template matching using this rectangular region as a search range. In the definitive update, the display control unit 13b performs normal processing using a predetermined rectangular region of this frame as a search range without referring to another frame.

The display control unit 13b performs the provisional update during progress of change of the screen, and performs the definitive update upon stop of the change. Thereafter, the display control unit 13b performs no update while displaying a result of this definitive update until the next change of the screen starts, and starts the provisional update on the basis of the position of an icon at that time when change of the screen starts again.

Figure 2:
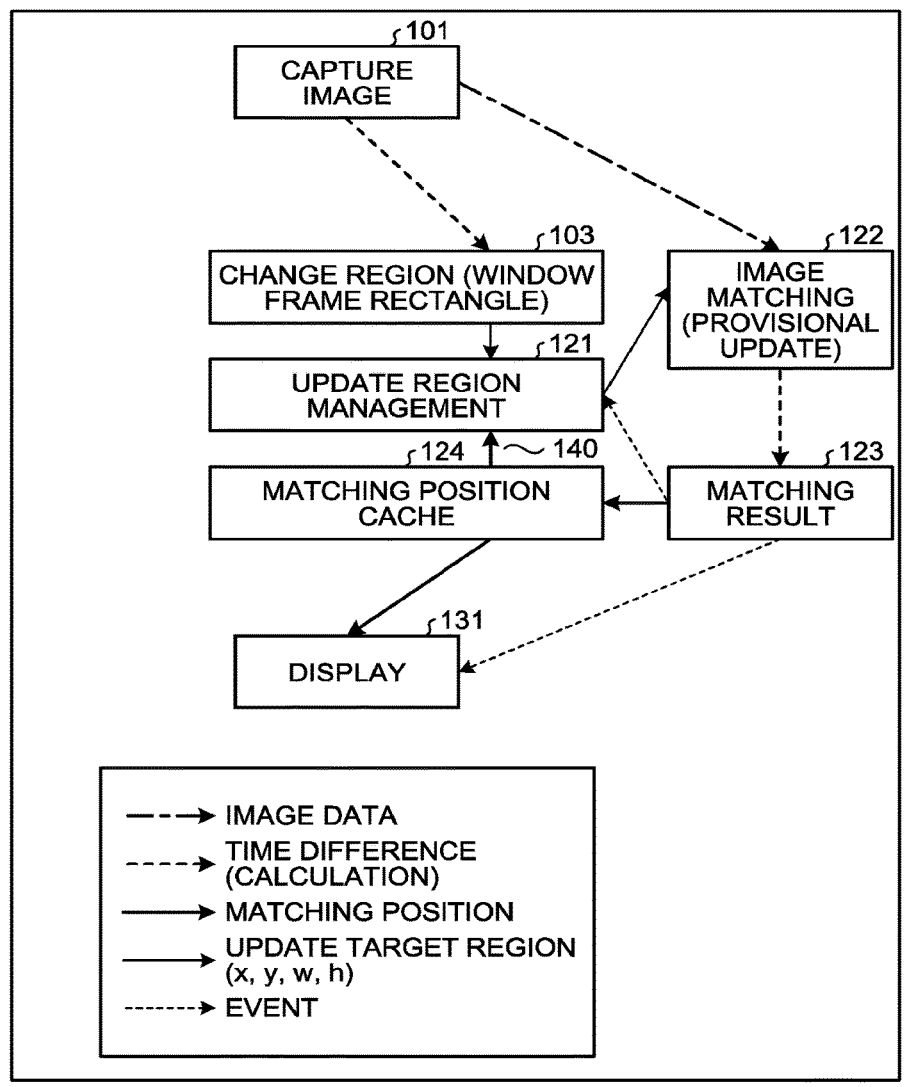
FIG. 2 is a diagram for describing the outline of provisional update processing executed by the display control device according to the first embodiment.

The following describes the outline of the provisional update processing with reference to FIG. 2. FIG. 2 is a diagram for describing the outline of the provisional update processing executed by the display control device according to the first embodiment. The example illustrated in FIG. 2 conceptually illustrates each function of the display control device 10. In the example illustrated in FIG. 2, processing of performing image matching, processing of detecting change on the screen, and processing of performing overlay display of an icon are executed through different threads.

In FIG. 2, a function 101 and a function 103 correspond to a functional block for detecting change on the screen, functions 121 to 124 correspond to a functional block for performing image matching, and a function 131 corresponds to a functional block for executing the processing of performing overlay display of an icon.

The processing of detecting change on the screen needs to be executed in a short period to avoid missed detection of any change because change on the screen also occurs during the image matching calculation. The processing of performing overlay display of an icon depends on specifications of a mounted graphical user interface (GUI) platform. For example, in a case of a swing GUI of the Java (registered trademark) language, after execution of redrawing processing is requested to a window manager like a repaint message, the display processing is performed through a thread on the manager.

As illustrated in FIG. 2, the function 101 acquires a capture image, and outputs image data to the function 122. The function 103 receives the capture image from the function 101, extracts a change region (window-frame rectangle) of the entire window frame of the capture image, and notifies the function 121 of the coordinate values (x, y, w, h) of the rectangle as the change region. In this example, the change region is the frame boundary of an active window as the current processing target.

The function 121 generates a strip-shaped rectangle extended in the vertical direction or the horizontal direction on the basis of a matching position 140 acquired from the function 124, calculates intersection of the rectangle with the window-frame rectangle acquired from the function 103, and notifies the function 122 of a result of the intersection as a search region.

The function 122 receives a template image and the search region from the function 121, and acquires the capture image of the search region at the time of execution from the function 101, and when all necessary data is obtained, performs matching calculation related to a template image for the current rule in accordance with the search region, and notifies the function 123 of a result of the matching. The function 124 registers a list of these matching positional coordinates to a hash map including the ID of this rule as a key.

The function 131 receives an event of a redrawing request from the function 123, acquires the positional coordinates of an icon to be displayed from the function 124, and performs overlay display of the icon. An icon for annotation is constantly positioned on a topmost layer of the desktop and drawn on a transparent window covering the entire desktop. This achieves overlay display of the icon on any window behind.

Figure 3:
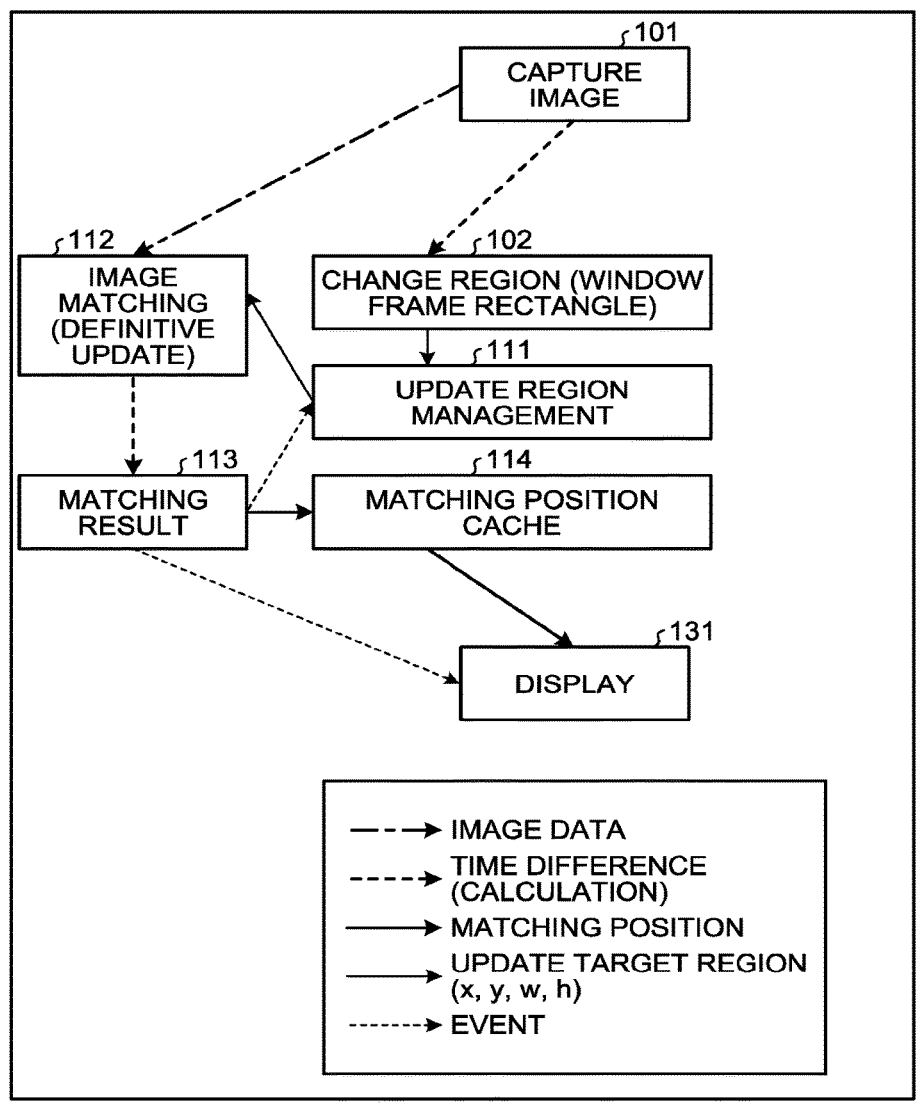
FIG. 3 is a diagram for describing the outline of definitive update processing executed by the display control device according to the first embodiment.

The following describes the outline of the definitive update processing with reference to FIG. 3. FIG. 3 is a diagram for describing the outline of the definitive update processing executed by the display control device according to the first embodiment. The example illustrated in FIG. 3 conceptually illustrates each function of the display control device 10. In the example illustrated in FIG. 3, processing of performing image matching, processing of detecting change on the screen, and processing of performing overlay display of an icon are executed through different threads.

In FIG. 3, functions 101 and 102 correspond to a functional block for detecting change on the screen, functions 111 to 114 correspond to a functional block for performing of image matching, and the function 131 corresponds to a functional block for executing the processing of performing overlay display of an icon.

As illustrated in FIG. 3, the function 101 acquires a capture image, and outputs image data to a function 112. The function 102 receives the capture image from the function 101, extracts change region (window-frame rectangle) of the entire window frame of the capture image, and notifies a function 111 of the coordinate values (x, y, w, h) of the rectangle as the change region. In this example, the change region is the frame boundary of an active window as the current processing target.

The function 112 receives a template image and the search region from the function 111, and acquires the capture image of the search region at the time of execution from the function 101, and when all necessary data is obtained, performs matching calculation related to a template image for the current rule in accordance with the search region, and notifies the functions 113 and 131 of a result of the matching. The function 114 registers a list of these matching positional coordinates to a hash map including the ID of this rule as a key in a cache memory. The function 114 is the function 124 described above. Thus, the function 114 or 124 caches a list of matching positional coordinates registered in the provisional update processing or the definitive update processing most recently executed. The function 131 receives an event of a redrawing request from the function 113, acquires the positional coordinates of an icon to be displayed from the function 114, and performs overlay display of the icon.

The following describes an exemplary scroll in which change occurs in a large area with reference to FIGS. 4A, 4B, and 4C. FIG. 4B illustrates an internal view of a scrolling panel. In FIG. 4B, a dotted line indicates a rectangle of a logically and internally existing view, and a dashed and single-dotted line indicates a visible range on the scrolling panel. FIG. 4C simply indicates definitions of annotation rules in this case.

The definitions each specify a title string of a target window, an activation path of a target process, and a template image (in this example, a picture image). The example illustrated in FIG. 4C indicates, for example, the definition of an annotation rule according to which a window of "notepad.exe" having a title including a partial string of "untitled" is searched for a coordinate position at which matching is made with an image such as "A", and an icon is displayed at the coordinate position. For simplicity of description, the icon is displayed at the center of a rectangle when a template is placed over a matched position.

When annotation is displayed in the state illustrated in FIG. 4A, an icon generated on the basis of rule 1 is displayed at two positions of image "A" in the visible range. This is the same for images "B" and "C". When the view is scrolled upward, a region that was previously not visible is scrolled into the visible range. As a result, image "A" that was hidden below becomes visible.

The provisional update is an update method that uses, as a search range for rule 1 in the next frame, the rectangle illustrated with the dashed and double-dotted line in FIG. 4B, in other words, a rectangle as a result of intersection of, with the visible range, an extension of two matching positions in the previous frame in the vertical direction. This method requires a smaller amount of calculation than the definitive update that searches the entire visible range, and thus is faster.

However, the method lacks the accuracy of a result. Specifically, image "A" 1013, which was previously hidden below, is still out of the search range when scrolled in, and the existence thereof is not recognized. Thus, while scrolling continues, in other words, during the provisional update, two images "A" 1011 and 1012 for which icons have already been displayed move upward while an icon for image "A" 1013 is not displayed.

FIG. 5 illustrates a region that is potentially not recognized on an image of a screen of a web browser. As illustrated in FIG. 5, a region not included in a provisional matching target region in a visible region newly scrolled in when the screen of the web browser at start of scrolling is vertically scrolled is a region in which appearance of any new icon is potentially not recognized, and as a result, display of the icon is missed.

In a web browser, a scroll panel occupies a most part of a window, but the amount of calculation of image matching can be reduced by narrowing a search range. In reality, when a plurality of icons dispersively exist, the reduction is less effective. In addition, this reduction effect is not obtained for scrolling in the horizontal direction and any screen change other than scrolling. However, the overlay display of annotation is useful when a user searches for necessary information in an intra-site or intra-system screen while scrolling a web browser. This is because a large difference in usability is provided when annotation integrally follows movement by scrolling.

In such a scene, a large movement in the vertical direction by half of the height of a window or larger needs to be taken into consideration, and thus a search range is increased to the height of the entire window frame. In a method typically used for a camera image, a search range having a width and a height same as those of a template image with added margins is used, and the present method is a variation thereof in a broad sense. However, the present method is different from the typically used method in that the present method exploits a characteristic of a change scene that frequently occurs on a screen of a PC and for which the provisional update is important.

The provisional update is based on an idea of reducing the amount of calculation by reducing the accuracy. This point will be further described in the present method. In the example illustrated in FIG. 4B, when scrolling is further continued, images "A" 1011 and 1012 for which icons were previously displayed are scrolled out, and the icons disappear. When scrolling is continued in the opposite direction without stopping to again scroll in images "A" 1011 and 1012, no icon according to rule 1 exists, and a search range for the next frame is an empty rectangle, and thus image matching is skipped and not calculated. Accordingly, similarly to the case in which image "A" 1013 is scrolled in, once an icon disappears, the existence of the icon is not recognized while the provisional update continues.

The same occurs in a case in which the search range is not empty but narrowed. Specifically, when the direction of scrolling is inverted between image "A" 1011 and image "A" 1012 without stopping the operation to again scrolled in image "A" 1011 having scrolled out and disappeared once, no icon is displayed for the image. However, when image "A" 1011 is positioned directly above 1012, in other words, within the range of extension in the vertical direction instead of the position illustrated in FIG. 4B, the icon is displayed again.

In a case of "C", assume that "C" 1017 is scrolled in when scrolling is performed while icons are displayed for "C" 1016 and "C" 1018. In this case, a search range is a minimum rectangle including a rectangle obtained by extending "C" 1016 and "C" 1018, and thus "C" 1017 is recognized and an icon is displayed therefor. In the description so far, union calculation is performed on search ranges obtained from matching positions of the same kind to obtain one rectangle, but instead, image matching processing may be performed a plurality of times for a plurality of search ranges. Alternatively, switching may be dynamically performed between these methods on the basis of dispersion of matching positions. Any of these method is a variation of an internal processing algorithm of the provisional update, and is effective for the configuration according to the present invention.

As it is clear from the above description, the provisional update is not a method of estimating a specific search range, but is an idea of transiently using inaccurate but fast update processing on the basis of such an estimation method. In particular, selection of a trade-off for the accuracy is important, and it is important to allow a false negative event that no icon is displayed at a position at which an icon is expected to exist. In other words, the present invention does not allow a false positive event that an icon is wrongly displayed at a position at which the icon is not expected to exist. Accordingly, repetition of the provisional update does not lead to the appearance of an increasing number of icons not expected to be displayed, but to the wrong disappearance of an icon expected to be displayed. Thus, the trade-off for the accuracy is merely disappearance of all icons in the worst case, and does not cause increase in a load on a processing system.

The configuration according to the present invention has a characteristic that the provisional update does not guarantee the accuracy of a result, but the definitive update is performed as appropriate to enable precise determination and detection of an icon expected to exist. However, the definitive update requires a large amount of calculation, and thus is desirably executed not halfway of scrolling but after the operation has ended and change of the screen has ceased. The start and end of change of the screen is performed by a computer program, and thus a screen change detection procedure is executed as internal processing by the detection unit 13*a*.

[Exemplary Processing by Display Control Device]

Figure 6:
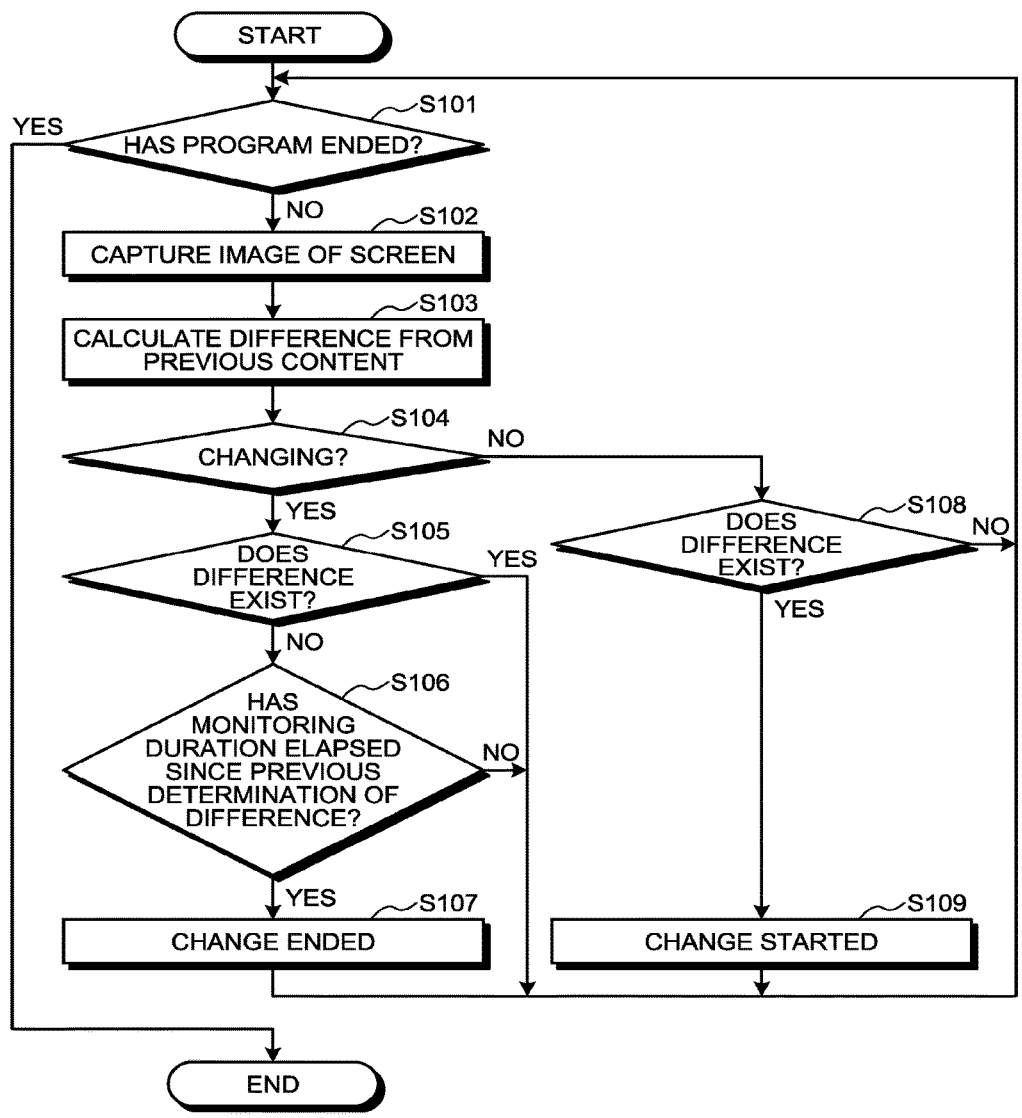
FIG. 6 is a diagram for describing the process of screen change detection processing at the display control device according to the first embodiment.
Figure 7:
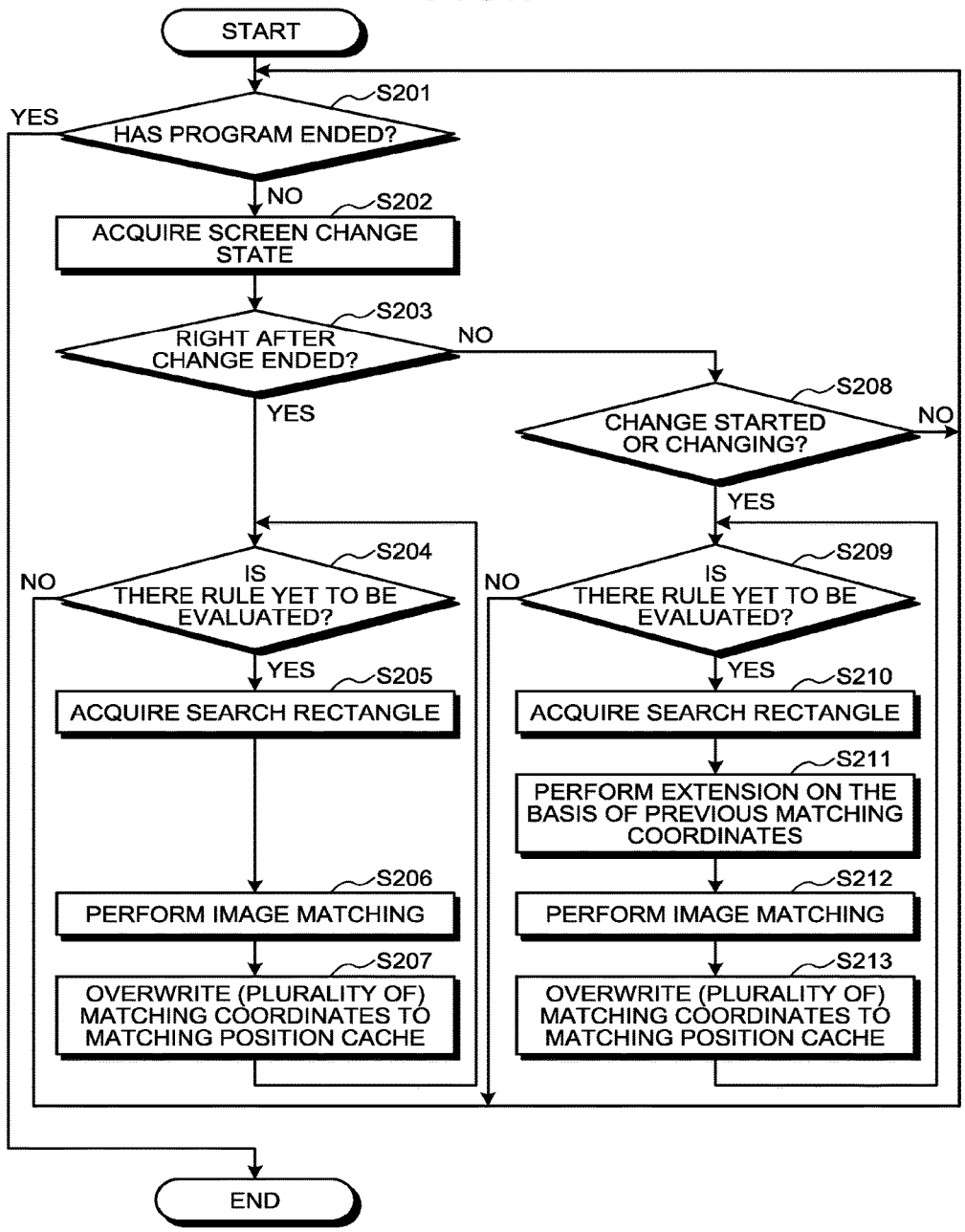
FIG. 7 is a diagram for describing the process of screen update processing at the display control device according to the first embodiment.

The following describes processing at the display control device 10 according to the first embodiment with reference to FIGS. 6 and 7. FIG. 6 is a diagram for describing the process of screen change detection processing at the display control device according to the first embodiment. FIG. 7 is a diagram for describing the process of screen update processing at the display control device according to the first embodiment.

First, the process of the screen change detection processing at the display control device 10 will be described with reference to FIG. 6. This processing is executed through an independent thread and loops until a computer program executing an annotation system ends.

As illustrated in FIG. 6, the detection unit 13*a* of the display control device 10 determines whether a computer program executing annotation has ended (step S101). As a result, if the computer program executing annotation has ended (Yes at step S101), the detection unit 13*a* ends the screen change detection processing. If the computer program executing annotation has not ended (No at step S101), the detection unit 13*a* obtains a capture of the screen (step S102), and calculates a difference thereof from the previous content (step S103).

Specifically, the detection unit 13*a* performs comparison in a bit pattern between the screen capture and the previous content to obtain a differential bit map. In other words, the detection unit 13*a* compares values for each pixel, and stores "0" if the values are the same or "1" if the values are different from each other. Any "1" outcome during this processing indicates that a difference exists. Then, when "difference exists", the detection unit 13*a* stores therein the current time.

Subsequently, the detection unit 13*a* determines whether a change state flag currently indicates "changing" (step S104). As a result, if the change state flag currently indicates "changing" (Yes at step S104), the detection unit 13*a* determines whether "difference exists" (step S105). Then, if it is determined that "difference exists" (Yes at step S105), the detection unit 13*a* returns to step S101.

If it is determined that no "difference exists" (No at step S105), the detection unit 13*a* determines whether a monitoring duration has elapsed since the previous determination of "difference exists" (step S106). For example, the detection unit 13*a* calculates a difference between the time of the previous determination of "difference exists" and the current time, and determines whether the monitoring duration has elapsed. The monitoring duration is a time set in advance, and is, for example, 1000 msec as a shorter setting, and 3000 msec as a longer setting.

As a result, if it is determined that the monitoring duration has not elapsed since the previous determination of "difference exists" (No at step S106), the detection unit 13*a* returns to step S101. If it is determined that the monitoring duration has elapsed since the previous determination of "difference exists" (Yes at step S106), the detection unit 13*a* notifies the display control unit 13*b* of "change ended" as the state of the screen (step S107), and then returns to step S101.

In the processing at step S104, if it is determined that the change state flag currently does not indicate "changing" (No at step S104), the detection unit 13*a* determines whether "difference exists" (step S108). Then, if it is determined that no "difference exists" (No at step S108), the detection unit 13*a* returns to step S101. If it is determined "difference exists" (Yes at step S108), the detection unit 13*a* notifies the display control unit 13b that the state of the screen is a state in which "change has started" (step S109), and then returns to step S101.

The following describes the process of the screen update processing at the display control device 10 with reference to FIG. 7. This processing is executed through an independent thread and loops until the computer program executing the annotation system ends.

As illustrated in FIG. 7, the display control unit 13b of the display control device 10 determines whether the computer program executing annotation has ended (step S201). As a result, if the computer program executing annotation has ended (Yes at step S201), the display control unit 13b ends the screen update processing. If the computer program executing annotation has not ended (No at step S201), the display control unit 13b acquires a screen change state (step S202), and determines whether the screen change state is a state right after "change ended" (step S203).

If it is determined that the screen change state is a state right after "change ended" (Yes at step S203), the display control unit 13b determines whether there is a rule yet to be evaluated (step S204). As a result, if it is determined that there is no rule yet to be evaluated (No at step S204), the display control unit 13b returns to step S201.

If it is determined that there is a rule yet to be evaluated (Yes at step S204), the display control unit 13b acquires a search rectangle (change region) (step S205). The change region is defined by rectangular coordinate values of x, y, w, and h. In the processing at step S205, the change region is always the boundary of the frame of an active window as the current processing target.

Then, the display control unit 13b performs image matching (step S206). The image matching performs matching calculation related to a template image of the current rule in accordance with the search region. Then, the display control unit 13b overwrites a list of matching coordinates to a hash map including the ID of the rule as a key in a matching position cache (step S207). Thereafter, the display control unit 13b returns to step S204 and repeats the processing at steps S204 to S207 as long as there is a rule yet to be evaluated.

In the processing at step S203, if it is determined that the screen change state is not a state right after "change ended" (No at step S203), the display control unit 13b determines whether the screen change state is a state in which "change has started" or a state in change (step S208). As a result, if it is determined that the screen change state is not a state in which "change has started" or a state in change (No at step S208), the display control unit 13b returns to step S201.

If it is determined that the screen change state is a state in which "change has started" or a state in change (Yes at step S208), the display control unit 13b determines whether there is a rule yet to be evaluated (step S209). As a result, if it is determined that there is no rule yet to be evaluated (No at step S209), the display control unit 13b returns to step S201.

If it is determined that there is a rule yet to be evaluated (Yes at step S209), the display control unit 13b acquires a search rectangle (change region) (step S210), performs the extension on the basis of the previous matching coordinates (step S211), and executes image matching (step S212). Specifically, the display control unit 13b generates an extended rectangle on the basis of the previous matching coordinates, calculates intersection of the extended rectangle with the window-frame rectangle, and executes image matching using a result of the intersection as a search region.

Then, the display control unit 13b overwrites matching coordinates to the matching position cache (step S213).

Thereafter, the display control unit 13b returns to step S209, and repeats the processing at steps S209 to S213 as long as there is a rule yet to be evaluated.

Figure 8:
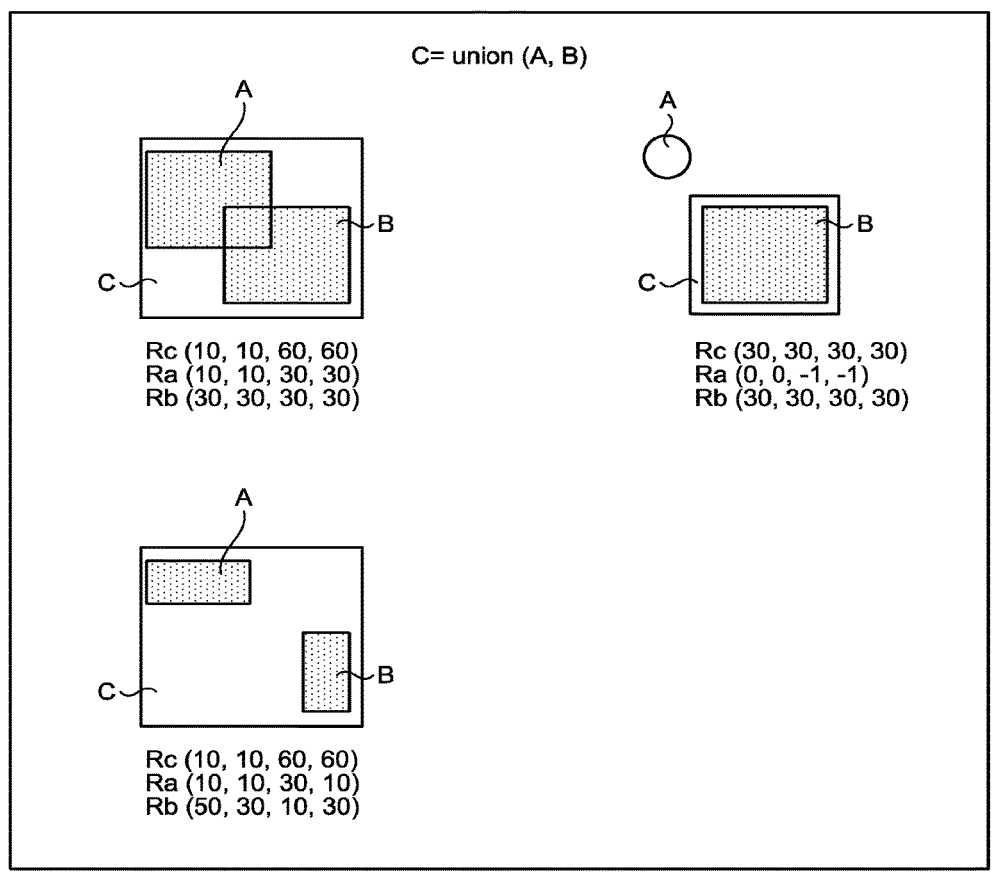
FIG. 8 is a diagram for describing union calculation on rectangles.
Figure 9:
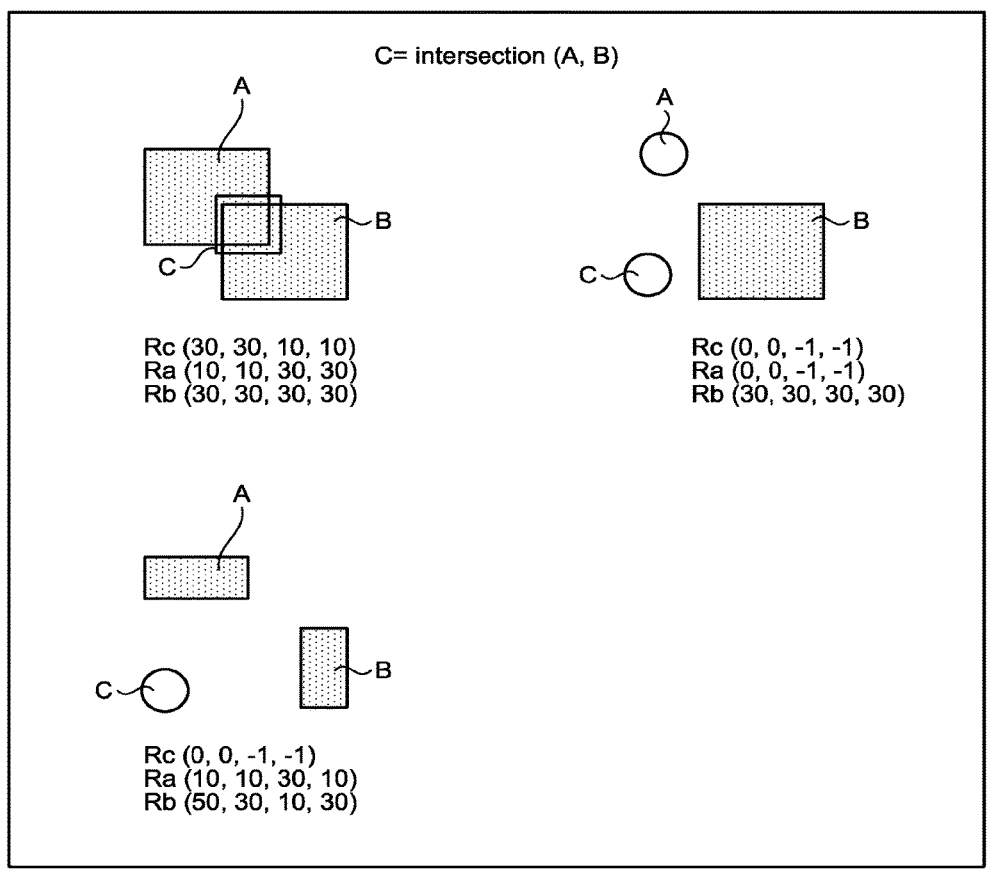
FIG. 9 is a diagram for describing intersection calculation on rectangles.

The following describes the rectangular coordinate values defined above. The rectangular coordinate values are values (x, y, w, h) as combination of the upper-left coordinates (x, y) of a rectangle and the dimensions (w, h) of the rectangle. FIG. 8 illustrates an exemplary union calculation on the rectangle, and FIG. 9 illustrates an exemplary intersection calculation. In FIGS. 8 and 9, virtual rectangular coordinate values are defined to represent an empty range that occupies no region on the plane. In this example, the rectangular coordinate values of (0, 0, −1, −1) represent an empty range, and union and intersection calculations are extended to support calculation on a set of points included inside.

In the union calculation in the example illustrated in FIG. 8, for example, the rectangular coordinate values of A are Ra (0, 0, −1, −1), and the rectangular coordinate values of B are Rb (30, 30, 30, 30), the rectangular coordinate values of C are Rc (30, 30, 30, 30). In the intersection calculation in the example illustrated in FIG. 9, for example, the rectangular coordinate values of A are Ra (0, 0, −1, −1), and the rectangular coordinate values of B are Rb (30, 30, 30, 30), the rectangular coordinate values of C are Rc (0, 0, −1, −1).

[Effects of First Embodiment]

In this manner, the display control device 10 according to the first embodiment detects change of a screen, and executes, depending on the detected change of the screen, any one or both of the provisional update processing that generates a strip-shaped rectangular region extended in the vertical direction or the horizontal direction on the basis of the position of an icon displayed on the screen, searches the screen for a region similar to a specified image template by using the rectangular region as a search range, and performs overlay display of an icon in the similar region, and the definitive update processing that searches for a region similar to the image template by using, as a search range, a region larger than the search range of the provisional update processing and performs overlay display of an icon at a position corresponding to the similar region. This allows reduction of a processing load to shorten a processing time, thereby achieving fast screen update processing.

The display control device 10 detects progress or stop of change of the screen, and executes the provisional update processing if the progress of change of the screen is detected, or the definitive update processing if the stop of change of the screen is detected.

Thus, the display control device 10 provides a moving image with image interpretation in real time by using, for example, image template matching, and allows a user to visually understand the content of the interpretation by, for example, performing overlay display of a result of the image interpretation, and to recognize the content of the interpretation integrally by, for example, updating display of the content of the interpretation in synchronization with change and motion of the content of the moving image.

Second Embodiment

In the first embodiment described above, the provisional update is executed if progress of change of a screen is detected, and the definitive update is executed when stop of change of the screen is detected, but the present invention is not limited thereto, and the definitive update and the provisional update may be executed in parallel. The following describes a second embodiment in which the definitive update and the provisional update are executed in parallel.

Description of any configuration and processing identical to those in the first embodiment will be omitted.

The first embodiment requires the monitoring duration in which whether a screen change has ended is determined, and the switching of update processing in accordance with a result of the determination. The second embodiment does not require these elements. In the first embodiment, whether a screen change has ended can be determined typically by a method of observing whether a state in which there is no difference between frames continues for a predetermined duration for stop determination, but the usability of annotation is potentially degraded with a too short or long duration of the observation. An optimum setting is not obvious, but depends on individual conditions such as user preference and PC performance, and intention of the user and behavior of a used GUI in each operation situation. Thus, it is intrinsically difficult to satisfy all requirements with fixed values.

When the user moves a mouse while trying to continuously perform a series of scroll operations, a drag position often stops halfway for a moment. In such a moment, when the stop continues for a duration slightly longer than a set observation duration, the definitive update is started against the user's operational intention. Once the definitive update is started, any next processing cannot be performed until calculation is completely finished. In other words, when the drag position stops for a slightly longer duration although the user tries to continuously perform scrolling, the provisional update is not performed for subsequently resumed movement. The user sees that overlay display is not in synchronization with the screen because an icon is left at a halfway position as display of annotation freezes while display of the GUI is moving by scrolling. When the definitive update ends after this duration continues, and the provisional update is resumed, overlay display is suddenly performed at an appropriate scroll position of the screen, and the movement appears to be resumed. In other words, the icon appears to be momentarily stuck at a halfway position in a series of scroll operations.

When the user has stopped an operation with the intention to stop scrolling, a determination that screen change has stopped is not made until the observation duration has elapsed. In other words, calculation of the definitive update is started after an additional duration has elapsed since the scrolling has stopped, and thus application of a result of the definitive update, which already requires a long processing time, is idly delayed. In the original idea of the provisional update, however, it is assumed that, when a display disorder occurs halfway of scrolling due to the provisional update of an icon, the disorder is solved by performing the definitive update after the scrolling has stopped.

Thus, it is desirable to complete image matching in the definitive update and return to display with no disorder as soon as possible after the user has stopped a scroll operation. However, when application of a result of the definitive update is largely delayed as described above, an expected state of overlay display is not achieved for a while despite the user's intention to stop a scroll operation and the user needs to wait, which is a reaction insensitive to an operational intention of the user. For this reason, in the first embodiment, icon display cannot smoothly follow an operation by the user, which provides the user with a feel of unnatural operation in some cases. In the second embodiment, the definitive update and the provisional update are executed in parallel to solve the above-described problem.

Unlike the first embodiment, the second embodiment does not need to switch the two update methods, and thus there is no problem with, for example, the optimum setting of the observation duration. In the second embodiment, the provisional update performs calculation on the basis of a result of the most recent frame, and thus, for example, a rule with an icon scrolled out will no longer be applied and can be excluded as a target to be applied in the following provisional update.

In the second embodiment, a simple calculation method of the provisional update can be easily extended. Specifically, the provisional update in the description so far employs simple calculation based on assumption of vertical or horizontal scrolling, but various extensions can be possible in reality. For example, the direction and the length of the extension are adjusted in accordance with transition of a moving direction and a moving distance through the previous few frames, thereby achieving a further reduced search range.

With the conventional configuration, however, a result needs to be referred to mostly from the definitive update, and thus there is no freedom of extension, and further sophistication cannot be expected. In terms of speeding-up of a processing time, the definitive update requires a long calculation time, and is executed in loop asynchronously in an unfixed period in this configuration, and thus is out of synchronization with the provisional update, causing slowing down due to a wasted waiting time.

Firstly, the configuration of the display control device 10 according to the second embodiment is same as that in FIG. 1 described above, and thus description thereof is omitted, but the content of processing by the display control unit 13*b* is different. When the detection unit 13*a* detects change of a screen, the display control unit 13*b* executes the provisional update processing and the definitive update processing in parallel. In the provisional update processing, the display control unit 13*b* generates a predetermined region in the next provisional update processing on the basis of a position at which an icon is displayed in the previous provisional update processing already executed, and a position at which the icon is displayed in the definitive update processing.

Figure 10:
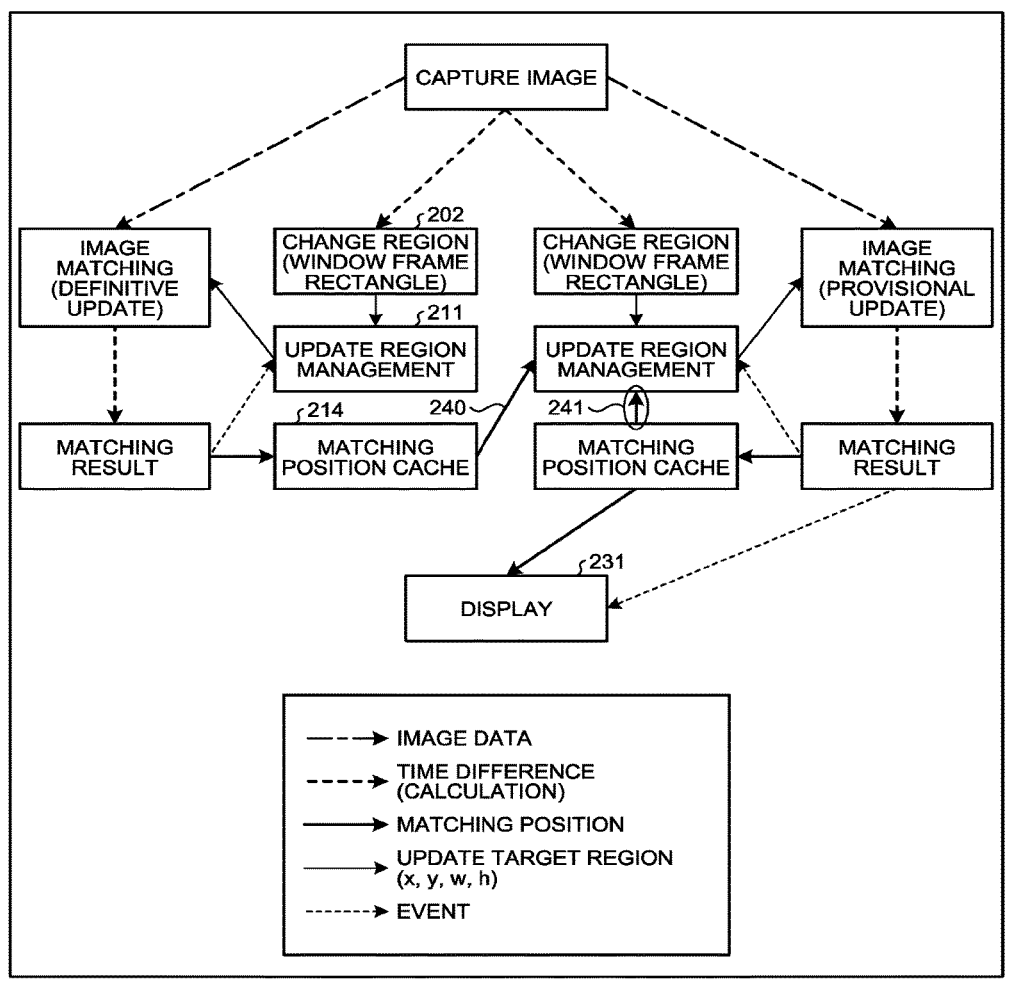
FIG. 10 is a diagram for describing the process of the definitive update processing at the display control device according to a second embodiment.

The following describes, with reference to FIG. 10, the outline of screen update processing that executes in parallel the provisional update processing and the definitive update processing executed by the display control device 10 according to the second embodiment. FIG. 10 is a diagram for describing the process of the definitive update processing at the display control device according to the second embodiment. As illustrated in FIG. 10, the display control device 10 according to the second embodiment performs the provisional update processing and the definitive update processing in parallel, and has a configuration similar to a combination of those in FIGS. 2 and 3 described above. A part connecting the left and right block groups represents matching position handover by a function 240. The left half of FIG. 10 corresponding to FIG. 3 hands over a result to the right half FIG. 10 corresponding to FIG. 2 instead of requesting processing to a display function of a function 231.

Figure 11:
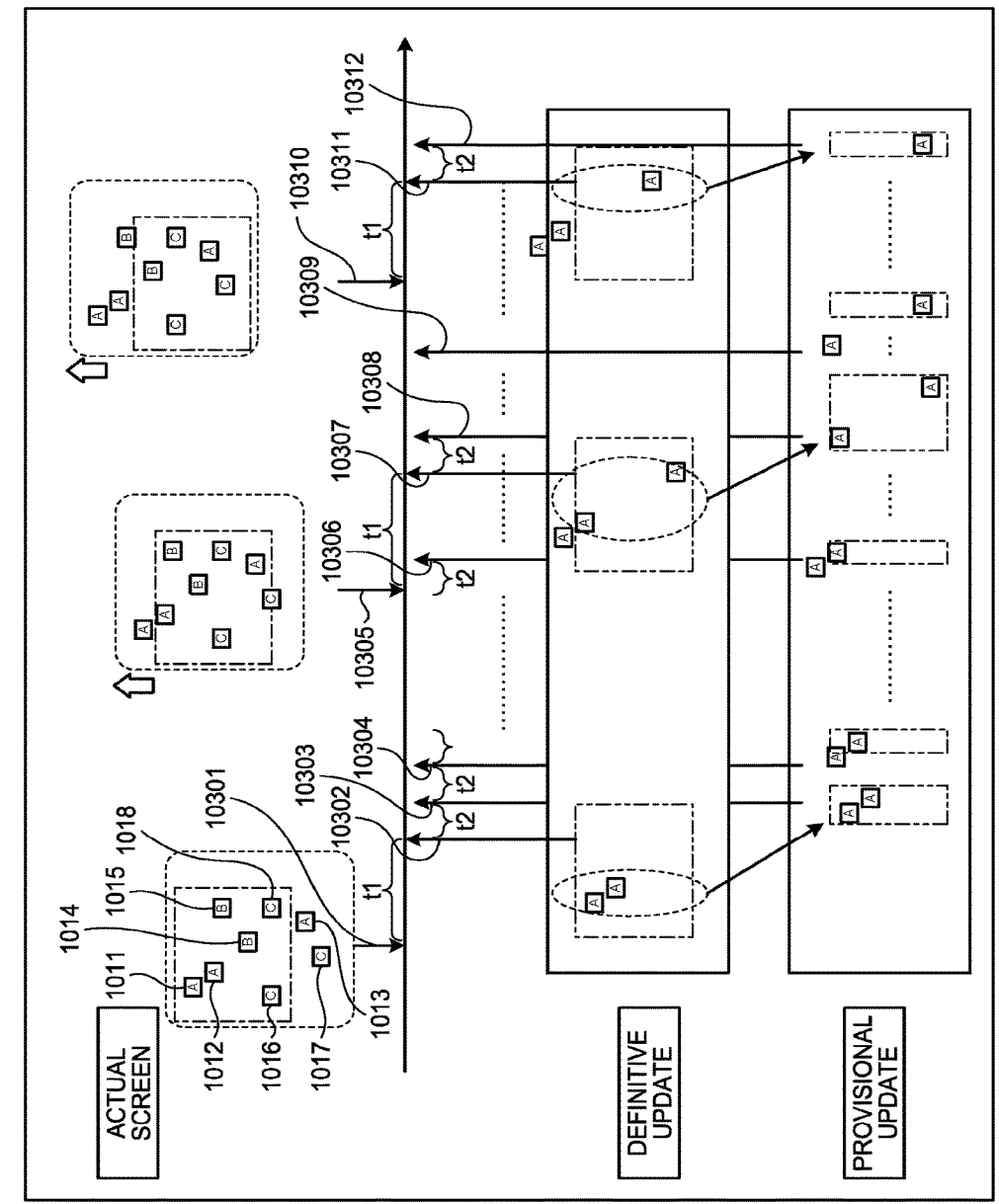
FIG. 11 is a diagram for describing screen update processing that executes the provisional update processing and the definitive update processing in parallel, together with actual screen update.

A characteristic point of the present invention is such that matching position handover 241 in FIG. 10 is performed in addition to matching position handover 240 in FIG. 10. The following describes a difference of effect between a case in which matching position handover 241 is performed and a case in which matching position handover 241 is not performed. FIG. 11 illustrates a temporal change in the example illustrated in FIG. 4B. In the example illustrated in FIG. 11, a result of calculation according to rule 1 in response to a change detected at time 10301 is output at time 10302.

At this moment, a matching position is handed over to the provisional update processing through 240 illustrated in FIG. 10, provided with update at time 10303, time 10304, or later, and applied on final display. The search range of image matching of the provisional update is illustrated with a dashed and double-dotted line. As for the search range at time 10304, when no processing is performed by 241, a result of the definitive update is constantly referred to. When matching position handover is performed by 241, 240 is referred to only once after a result of the definitive update is obtained, and once the result is acquired, only a result of the provisional update processing in the previous frame is referred to through matching position handover by 241. Thus, at time 10304, part of image "A" 1011 is scrolled out and only image "A" 1012 remains in a result of the provisional update, and thus the search range is narrowed as illustrated with a dashed and double-dotted line. This search range is used in the following provisional update.

At time 10305, image "A" 1013 is scrolled into the actual screen, but the existence thereof cannot be detected by the provisional update, and the narrowed search range is still used as indicated at time 10306. When the definitive update detects the existence of image "A" 1013 at time 10307, the matching position thereof is acquired by the provisional update through flow of 240 right after the detection, and a search range surrounding both of image "A" 1012 and image "A" 1013 is calculated at time 10308. This search range is used for a while in the following provisional update, and when image "A" 1012 is scrolled out like the case described above, the search range is narrowed as indicated at time 10309.

At time 10310, the definitive update captures an image of a state in which image "A" 1012 is scrolled out, and calculates image matching. A result of the calculation is output at time 10311 and acquired by the provisional update, but the provisional update at time 10312 provides the same matching result, and thus change of the search range does not occur at time 10312 or later. Calculation of the definitive update is not swiftly started at time 10309 but is delayed until time 10310 because image matching calculation of the definitive update requires a long calculation time t1 and although FIG. 11 only illustrates calculation according to rule 1 (rule of annotation display for image "A"), in reality, the calculation according to rule 1 is performed when a long time has further elapsed after time 10307 since the calculation is performed after calculation according to rule 2 and rule 3.

In an actual use scene, the number of rules is larger and a calculation time varies between the ruling, and thus an asynchronous timing shift more frequently occurs. For this reason, feedback calculation with a result of the provisional update is important. Such a behavior is needed as a prerequisite element when difference calculation on a change region to be introduced later, and a search range estimating algorithm in the provisional update are extended.

Figure 12:
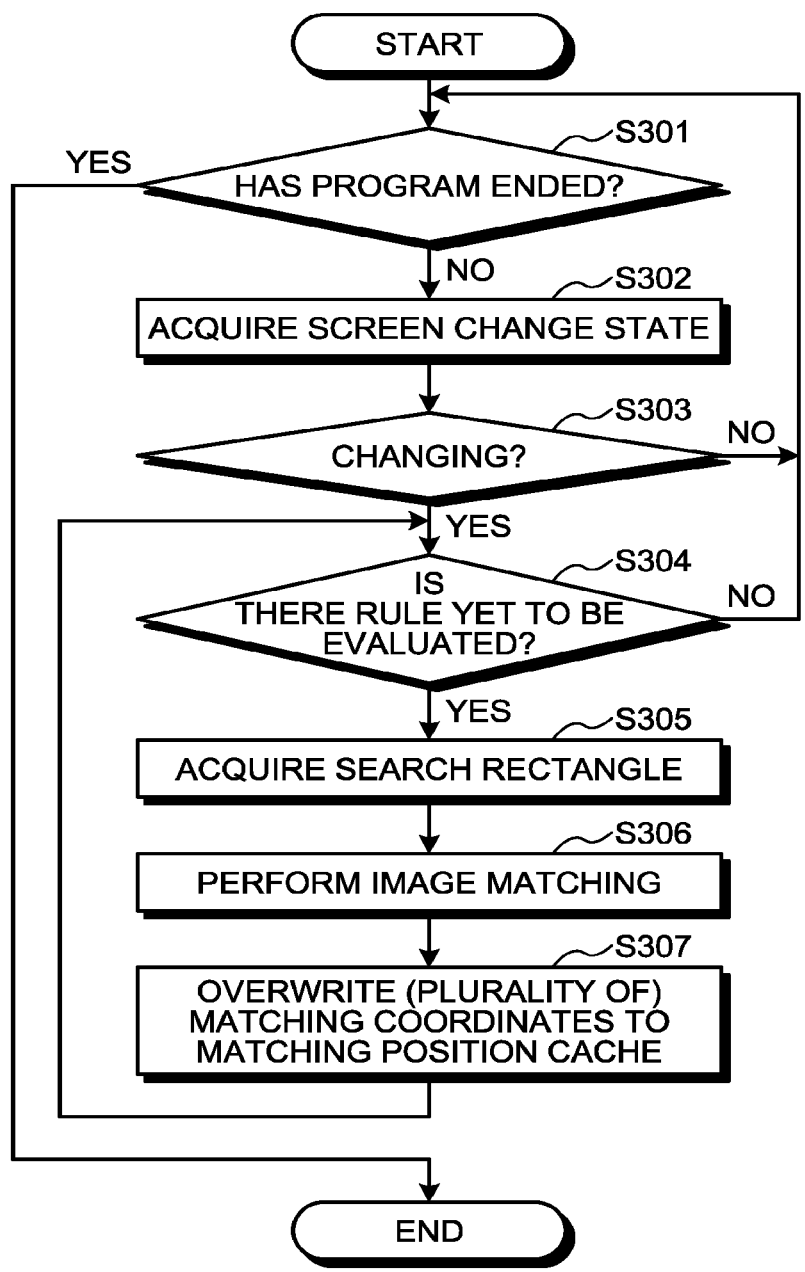
FIG. 12 is a diagram for describing the process of the definitive update processing at the display control device according to the second embodiment.
Figure 13:
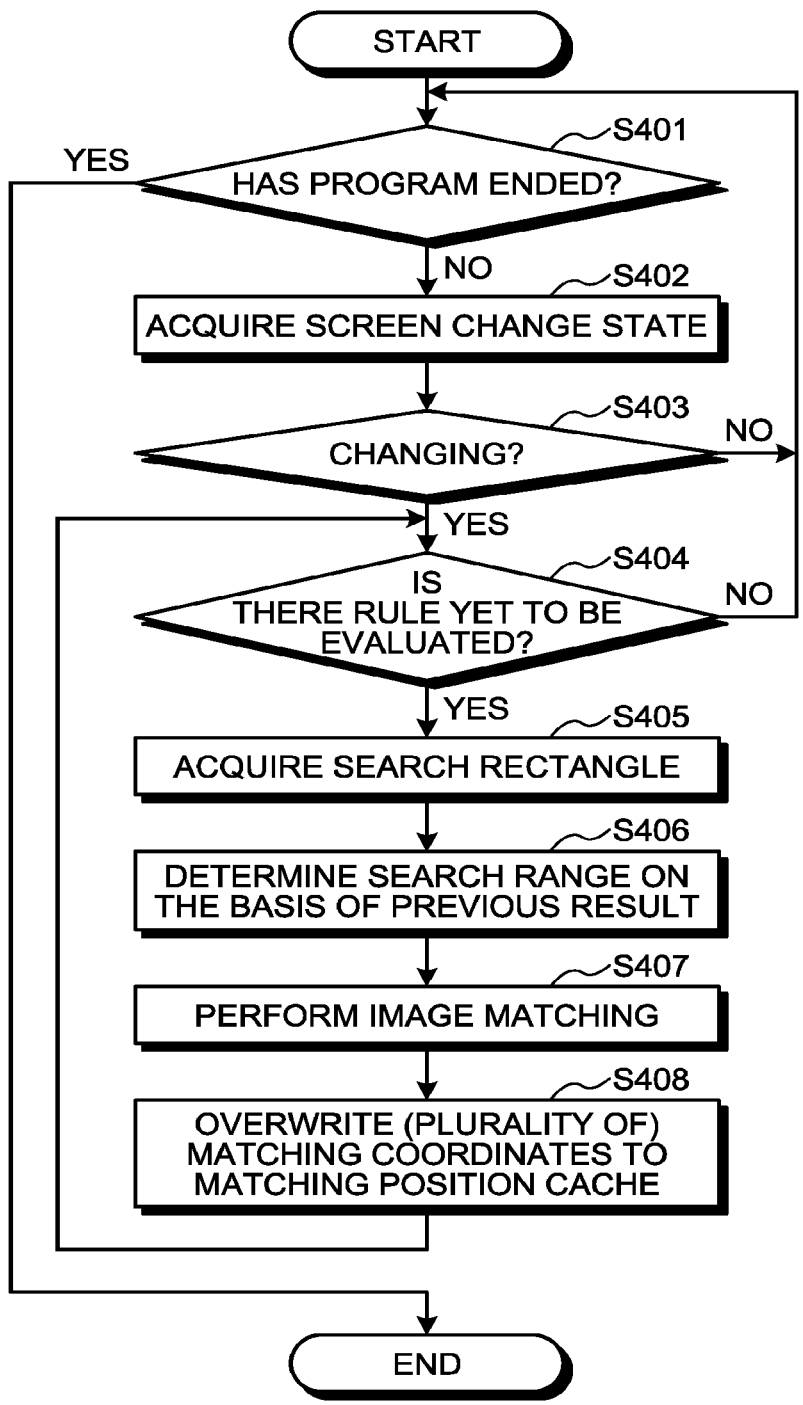
FIG. 13 is a diagram for describing the process of the provisional update processing at the display control device according to the second embodiment.

The following describes processing by the display control device 10 according to the second embodiment with reference to FIGS. 12 and 13. FIG. 12 is a diagram for describing the process of the definitive update processing at the display control device according to the second embodiment. FIG. 13 is a diagram for describing the process of the provisional update processing at the display control device according to the second embodiment.

As illustrated in FIG. 12, the display control unit 13*b* of the display control device 10 according to the second embodiment determines whether the computer program executing annotation has ended (step S301). As a result, if the computer program executing annotation has ended (Yes at step S301), the display control unit 13*b* ends the definitive update processing. If the computer program executing annotation has not ended (No at step S301), a display control unit 33*b* acquires a screen change state (step S302), and determines whether the screen change state indicates "changing" (step S303). As a result, if it is determined that the screen change state does not indicate "changing" (No at step S303), the display control unit 13*b* returns to step S301. In the second embodiment, the display control unit 13*b* simply determines only whether the screen change state indicates "changing" without identifying the start and end of change like the first embodiment.

If it is determined that the screen change state indicates "changing" (Yes at step S303), the display control unit 13*b* determines whether there is a rule yet to be evaluated (step S304). As a result, if it is determined that there is no rule yet to be evaluated (No at step S304), the display control unit 13*b* returns to step S301.

If it is determined that there is a rule yet to be evaluated (Yes at step S304), the display control unit 13*b* acquires a search rectangle (change region) (step S305). The change region is defined by rectangular coordinate values of x, y, w, and h. In the processing at step S305, the change region is always the boundary of the frame of an active window as the current processing target.

Then, the display control unit 13*b* performs image matching (step S306). The image matching performs matching calculation related to a template image of the current rule in accordance with the search region. Then, the display control unit 13*b* overwrites a list of matching coordinates to a hash map including the ID of the rule as a key in the matching position cache (step S307). Thereafter, the display control unit 13*b* returns to step S304, and repeats the processing at steps S304 to S307 as long as there is a rule yet to be evaluated.

Subsequently, as illustrated in FIG. 13, the display control unit 13*b* of the display control device 10 according to the second embodiment determines whether the computer program executing annotation has ended (step S401). As a result, if the computer program executing annotation has ended (Yes at step S401), the display control unit 13*b* ends the provisional update processing. If the computer program executing annotation has not ended (No at step S401), the display control unit 13*b* acquires a screen change state (step S402), and determines whether the screen change state indicates "changing" (step S403). As a result, if it is determined that the screen change state does not indicate "changing" (No at step S403), the display control unit 13*b* returns to step S401.

If it is determined that the screen change state indicates "changing" (Yes at step S403), the display control unit 13*b* determines whether there is a rule yet to be evaluated (step S404). As a result, if it is determined that there is no rule yet to be evaluated (No at step S404), the display control unit 13*b* returns to step S401.

If it is determined that there is a rule yet to be evaluated (Yes at step S404), the display control unit 13*b* acquires a search rectangle (change region) (step S405), performs the extension on the basis of the previous matching coordinates (step S406), and executes image matching (step S407). Specifically, the display control unit 13*b* generates an extended rectangle on the basis of the previous matching coordinates, calculates intersection of the extended rectangle with the window-frame rectangle, and executes image matching by using a result of the intersection as a search region.

Then, the display control unit 13b overwrites matching coordinates to the matching position cache (step S408). Thereafter, the display control unit 13b returns to step S404, and repeats the processing at steps S404 to S408 as long as there is a rule yet to be evaluated.

In this manner, in the display control device 10 according to the second embodiment, when change of a screen is detected, the provisional update processing and the definitive update processing are executed in parallel to allow icon display to smoothly follow an operation by the user, thereby providing the user with a feel of natural operation.

Third Embodiment

In the second embodiment, the entire window frame is always a processing target irrespective of the size of a change region as a difference of screen change, but the present invention is not limited thereto. Any unnecessary calculation may be omitted depending on the position and size of a change region to obtain the same result with a smaller amount of calculation.

Figure 14:
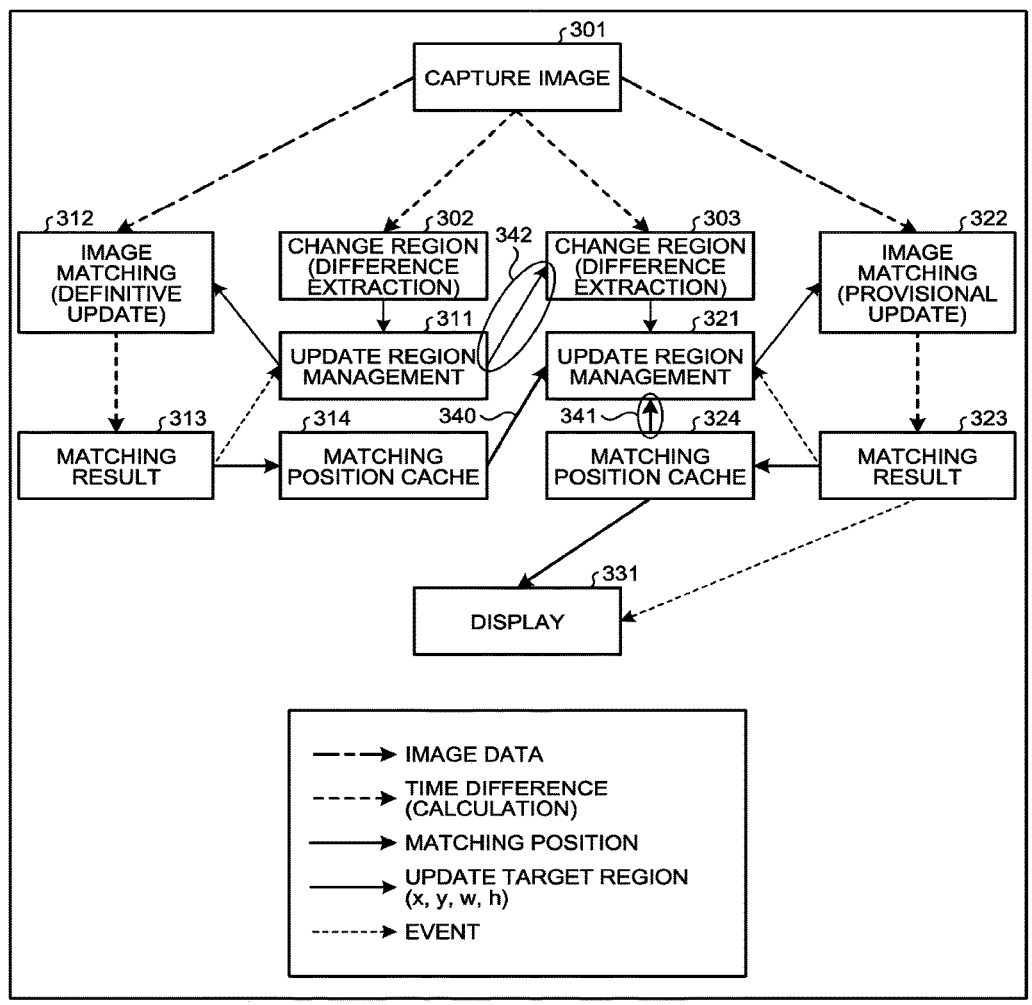
FIG. 14 is a diagram for describing the outline of screen update processing executed by the display control device according to a third embodiment, the screen update processing being configured to execute the provisional update processing and the definitive update processing in parallel.

In a third embodiment, with a configuration illustrated in FIG. 14, update processing is incrementally performed only on a change difference of a screen image. In description of the third embodiment below, description of any configuration and processing identical to those in the first embodiment or the second embodiment will be omitted. The configuration of typical processing of updating a change difference is the configuration illustrated in FIG. 14 except for arrows with circles, and the third embodiment is different from the conventional configuration in that data communication indicated as these connection lines is performed. With this configuration, when the definitive update processing has ended, a result thereof is passed to loop processing of the provisional update, and an operation is performed that adds, to an update region of the provisional update, rectangular data of an update region on the basis of which the result is obtained. Accordingly, when asynchronously passed, the result is included in a processing target of the provisional update together with the change difference, and reliably applied without missing in final display content, which is a difference from the conventional configuration.

The configuration of the display control device 10 according to the third embodiment is same as that in FIG. 1 described above, and thus description thereof is omitted, but the content of processing by the display control unit 13b is different. Similarly to the second embodiment, the display control unit 13b executes the definitive update processing and the provisional update processing in parallel, and also incrementally executes the provisional update processing and the definitive update processing by using, as a search region, a difference region of an image displayed on a screen between frames. Specifically, in the definitive update processing, the display control unit 13b extracts a difference region of the image displayed on the screen between frames, searches the screen for a region similar to a specified image template by using the difference region as a search region, and performs overlay display of an icon in the similar region, and in the provisional update processing, extracts a difference region, adds, to this extracted difference region, the difference region extracted in the definitive update processing, searches the screen for a region similar to a specified image template by using the difference region obtained through the addition as a search region, and performs overlay display of an icon in the similar region.

A characteristic of the third embodiment is that management of a change region is performed for each of the definitive update and the provisional update. FIG. 14 is different from FIG. 10 in that a function 302 and a function 303 each extract a difference between the previous and next frames and acquire a rectangle of a change region. Accordingly, image matching calculation can be performed only on an area smaller than the entire window frame.

However in the third embodiment, a result applied on final display content differs depending on an execution timing of cooperation between threads. In other words, in FIG. 14, a group of functional blocks 311 to 314 and a group of functional blocks 322 to 324 are allocated to different threads, and in many cases, image matching processing through 322 to 324 completes a plurality of cycles while image matching processing through 311 to 314 finishes one cycle. Depending on the execution timing and significant change in the area of a change region in each frame, a plurality of cycles of the image matching processing through 322 to 324 are executed during one cycle of the image matching processing through 311 to 314 in rare cases, which is the opposite magnitude relation between the execution speeds.

In order to avoid this influence and obtain a result same as that of the second embodiment, data asynchronously handed over between threads needs to be managed in a sophisticated manner, and application on final display is missed in some cases when data is simply handed over as it is.

Figure 15:
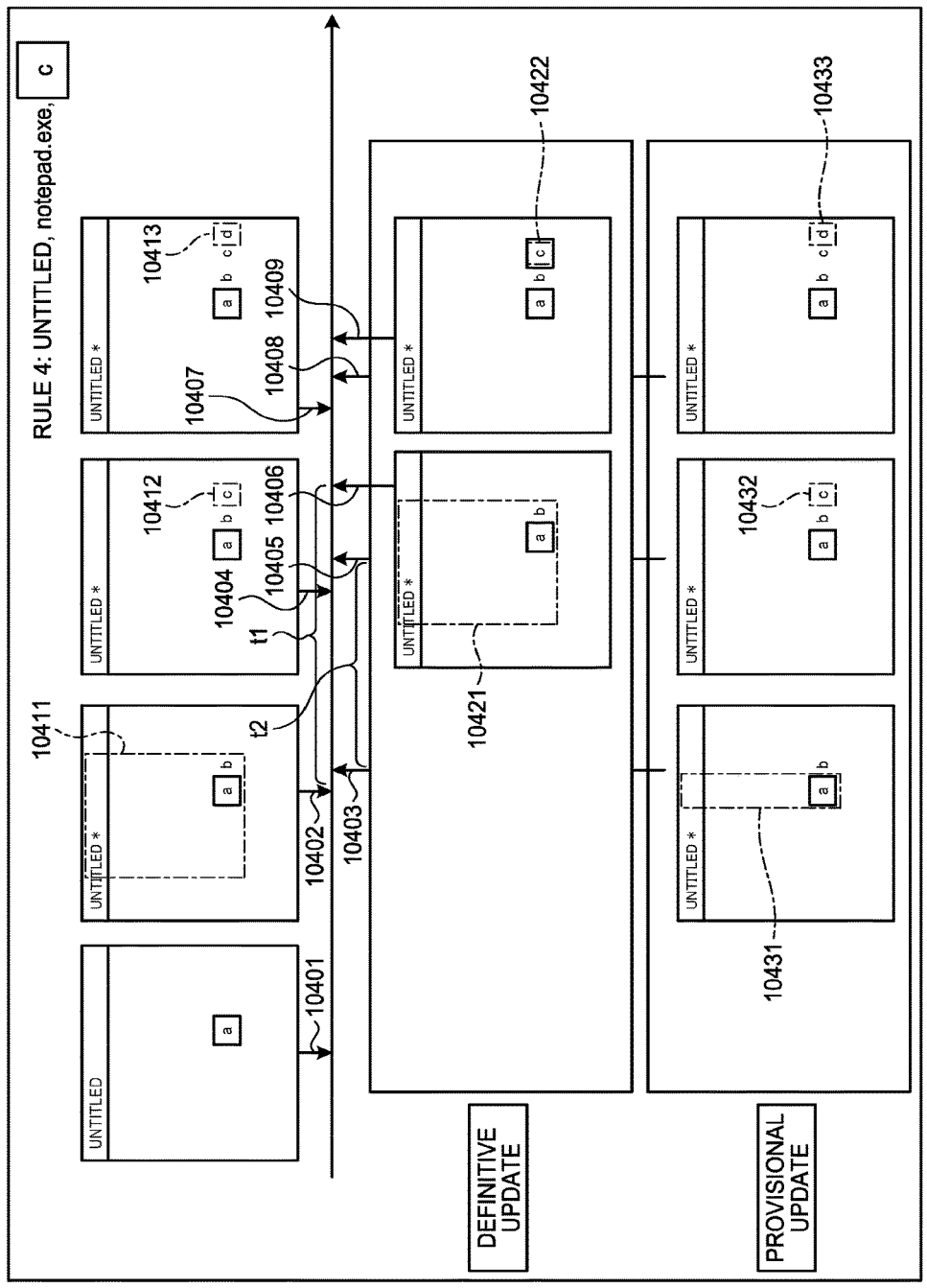
FIG. 15 is a diagram for describing a case in which missed detection occurs due to difference update and an asynchronous configuration.

The following describes, with reference to FIG. 15, a case in which string "a" is displayed on an editor of the same kind as that in FIG. 4B (10401), and a character is additionally input on the right side thereof. This editor displays, as a window title, the name of a file being edited, and when its content is edited, character "*" indicating that the content of the file has been changed is added to the title. When "b" is input at 10402 and the window title is changed, image change occurs at two places.

An update range for this change is rectangular region 10411 illustrated with a dashed and single-dotted line. The definitive update and the provisional update are simultaneously started by using this rectangular region 10411 as a calculation target. A result of the provisional update is obtained at 10403, and this calculation ends faster because a search range of rule 2 is narrowed to rectangle 10431 illustrated with a dotted line. In the definitive update, the search range is extended to a wide range like rectangle 10421, and the calculation takes time. Assume that "c" is input during the calculation (at 10404).

The search region becomes even smaller for this provisional update (10412), and thus the calculation ends in a short time (10405). Update region 10432 for change region 10412 is not recognized because a matching position corresponding to "c" according to rule 4 does not exist yet in a cache of a result of the definitive update, and thus no search range is set and no image matching is performed.

On the other hand, even when at 10406, a matching position in change rectangle 10421 is generated as a result of the definitive update, display processing of update region 10431 in the provisional update corresponding to the matching position has already ended. In this case, an icon for "a" is displayed from time 10401, and thus incidentally, a failure does not occur in a display content. However, a failure is not solved for "c" of rule 4. When a result of the provisional update for change region 10413 at time 10407 is output at time 10408, change rectangle 10433 is out of the change rectangle further to the right. When a result of the definitive update is output at time 10409, an opportunity of application on display through the provisional update has already been missed for matching position 10422. Even when a matching position exists in the cache of the result of the definitive update, an icon corresponding to this matching position is not generated and does not appear on overlay display unless a change region including this matching position is updated.

As described above, a region is missed or not recognized on display depending on the timing of execution and the content of display update. As a normal idea for preventing this, a result of the definitive update is merged into a result of the provisional update while a matching position as an update target is managed. In other words, for example, in data flow 240 illustrated in FIG. 10, a newly added matching position is added to the matching position cache used in the provisional update while taking into consideration an asynchronous timing and a difference of an update range between rules each time a result of the definitive update is obtained. In addition, in order to set the matching position added in this manner as a calculation target of the provisional update, union of the rectangular coordinate values of the matching position with the rectangle of a change region of the provisional update needs to be calculated.

However, this method has problems as follows. Firstly, unlike the case of screen change illustrated in FIG. 15, a matching position gradually shifts at each time in a case of change due to scrolling. With the present configuration, the matching position is not traced between frames but treated as a different matching position for each frame. Thus, when the provisional update incidentally takes time and a plurality of results of calculation of the definitive update are accumulated, a large number of matching positions are merged.

These matching positions include a matching position that does not exist any more in reality because actual screen content has already been moved by scrolling, and thus the search range is large. A computer program becomes complicated to perform generation and deletion of these matching positions and management of processed and unprocessed matching positions, and it is difficult to implement such a computer program and to examine whether the computer program correctly functions in all cases. Moreover, this management needs to be performed for each rule, which is a waste of storage area and calculation resources.

In the present configuration, these problems are solved by using data flow 342 illustrated in FIG. 14. The content of data handed over in the flow is the rectangular coordinate values (x, y, w, h) acquired as a change region from the function 302 by the function 311 when image matching processing is started by the function 312. When an event of an end of matching is received by the function 313 and calculation according to any necessary rule is ended, the data is added, through 342, to the rectangle of the change region held by the function 303 through union calculation.

At this stage, a result of the definitive update has already been stored in the matching position cache of the function 314. When the thread of the provisional update processing proceeds to the next processing cycle, the function 321 acquires the rectangular coordinate values as a change region from the function 303. This rectangle is a region accumulated by the function 303 as a difference of a capture image by a function 301 between frames, and includes a region added through 342 until start of the current calculation from the previous calculation. Based on the received rectangle as an update target range, the function 321 extracts a matching position in the range from the matching position cache used in the provisional update.

In addition, a matching position in the range is also extracted from the matching position cache used in the definitive update. A rectangle including all matching positions from the matching position caches is calculated and extended in the vertical direction, and then intersection of the rectangle with a rectangle of the update target range is calculated and set as a search range of image matching. This processing is performed for each rule.

In this manner, the problems with the method can be avoided by merging the rectangle of the update target range. Specifically, when screen content moves by scrolling, the latest matching position cache 314 at a moment when a matching position is acquired from data flow 340 is referred to, and thus accumulation of a plurality of calculation results does not occur. Complicated management of the matching position is unnecessary. In addition, information stored in data flow 342 and the function 303 is only one value common between all rules, in other words, the rectangular coordinate values, and thus complicated update management does not need to be performed for each rule, which can lead to no errors in the computer program. Through union calculation of data with the rectangle of a change region stored by the function 303, other processing can be achieved without changing the configuration of the third embodiment according to the normal idea, avoiding a waste of storage area and calculation resources.

Although omitted in the above description, the functional blocks 301 to 303 in FIG. 14, in other words, extraction of a change region will be described in detail below. The functional blocks 301 to 303 and the block group 331 illustrated in FIG. 14 are executed through different threads, and basically function as described with reference to FIGS. 2 and 3. A characteristic of the extraction of a change region is that processing that continuously captures an image of the screen and calculates a difference between frames is autonomously performed through the own thread. The definitive update and the provisional update are executed through different threads. The image matching calculation of the definitive update and the image matching calculation of the provisional update have a relatively large difference between execution times (for example, 5:1 to 10:1 approximately) due to a difference in the area of a search region. A change region is handed over between the three threads at asynchronous timing, which is handled as described below.

Specifically, calculation of a change rectangle is performed in a period sufficiently shorter than that of any update processing, in other words, a period even shorter than that of the provisional update to avoid any missing of a screen change by screen capturing. To obtain an accumulative change rectangle for a certain duration, a change rectangle at each moment (between two frames) is updated by performing a union calculation operation on an accumulative change rectangle at that moment. Upon an acquisition operation by each of the definitive update processing and the provisional update processing, a data value of the accumulative change rectangle is returned, and the rectangle is initialized to an empty rectangle. Each acquisition operation is performed at a different timing and a different interval, and thus two objects are prepared for the accumulative change rectangle.

Figure 16:
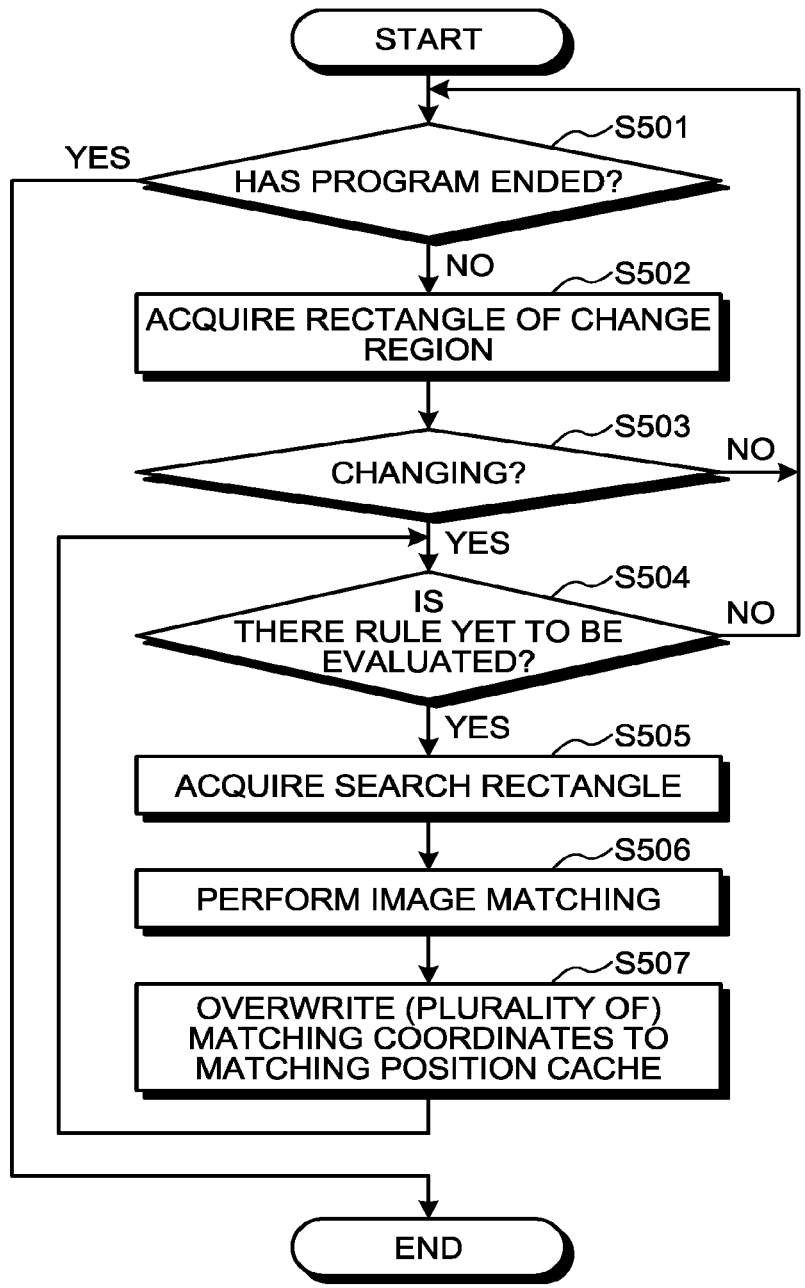
FIG. 16 is a diagram for describing the process of the definitive update processing at the display control device according to the third embodiment.

Although omitted in the above description, a method of calculating an update range of the position of an icon for a change region, and a search range of image matching will be described in detail below. At step S502 illustrated in FIG. 16 and step S602 illustrated in FIG. 17, the rectangle of a change region is acquired as a screen change state. A case in which a matching position (the size of a template image) is on the boundary of this rectangle is handled as described below.

First, it is determined whether a matching position of the previous frame is inside or outside of the rectangle, and if the matching position is outside of the rectangle, the matching position is temporarily excluded from an update target. Specifically, among a plurality of new matching positions obtained by image matching, a plurality of matching positions determined to be inside are replaced with caches, and any matching position determined to be outside is left intact. Note that any template image intersecting with the rectangle is determined to be inside. To put it the other way around, a new rectangle obtained by extending a change rectangle outside of the template image in width and height is calculated for each rule, and any matching position completely included in the new rectangle is determined to be inside. This new rectangle is referred to as an update range.

Figure 17:
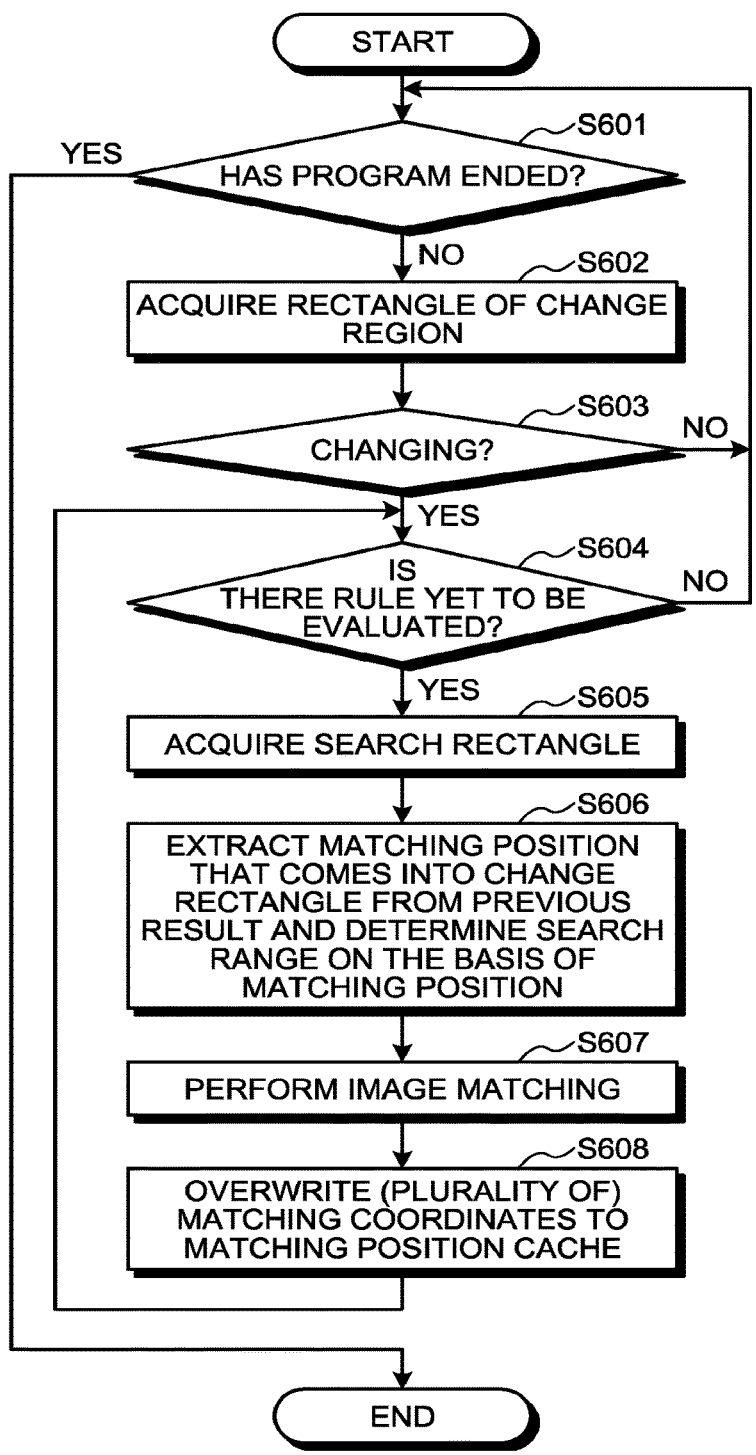
FIG. 17 is a diagram for describing the process of the provisional update processing at the display control device according to the third embodiment.

The search range of image matching needs to be extended accordingly. Specifically, the search range needs to be a new rectangle obtained by extending the rectangle of the change region outside of the template image in width and height. For this purpose, as illustrated in FIG. 17, in the provisional update processing, a matching position in the change rectangle is extracted from a previous result, and the search range is determined accordingly (step S606), and the image matching is performed (step S607). The update range and the search range are different between rules, but identical to each other for each rule. Accordingly, it is guaranteed that update is performed in just proportions when the matching position is on the boundary of the rectangle of the change region.

The image matching is typically used for a camera image in reality in many cases. When the image matching is continuously performed for a moving image video, the image matching may be performed with a search range limited to the vicinity of a matching position in the previous frame, thereby achieving reduction in the amount of calculation. This method has a deficit that an object at the matching position moves out of the search range when abruptly moving, and the matching position disappears in the next frame although the object exists on the video. The image matching fails and no matching position is obtained in some cases because a camera image naturally includes noise and shadow, making the angle and distance of an object change. For this reason, the disappearance of a matching position is not a significant problem in application in reality.

However, in a case of a screen image on the desktop of a PC, a failure due to the image matching occurs at an extremely small frequency. Missing and disappearance of a matching position that is obvious to human eyes are problems in application. The use of a search range in an extended shape according to the present configuration prevents the matching position from moving out of the search range at scrolling in the vertical direction. Typical scrolling is motion in one of the vertical and horizontal directions, and usually not motion in an oblique direction or in a dynamically changing direction. Thus, a long strip-shaped extending shape is preferable in the provisional update. In addition, annotation is applied to a GUI such as a web browser in which vertical scrolling is frequently performed, and thus it is known that almost no disadvantage occurs in reality by weighting the extension in the vertical direction.

Figure 18:
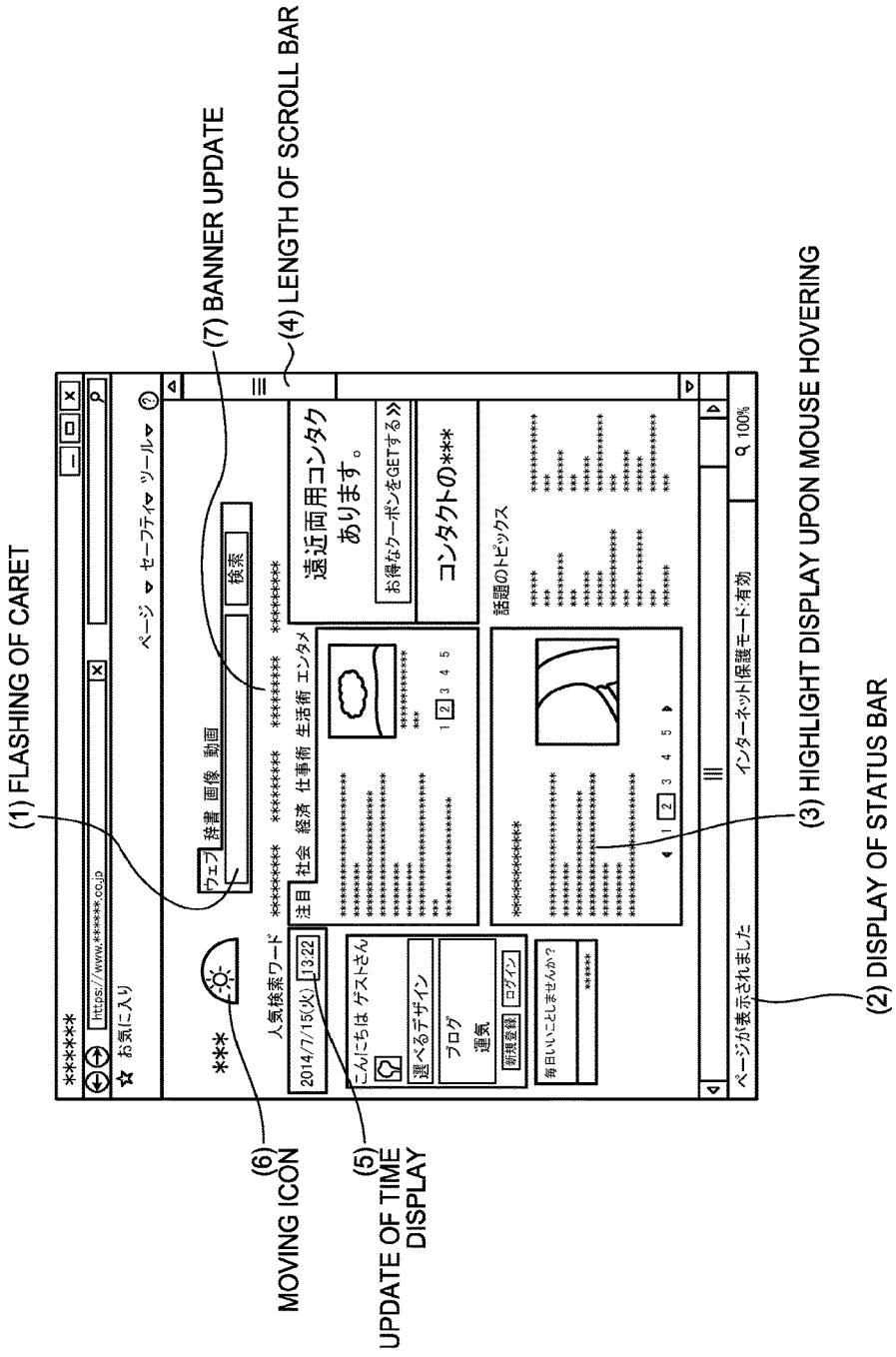
FIG. 18 is a diagram for describing a case in which difference update effectively functions.

Update of a difference limited to a change region provides large improvement of usability in an actual use scene. In a case of a web browser, as illustrated in FIG. 18, a large number of events are not recognized as change on the screen by a user, but are treated as change in bit comparison calculation. In (1), change continuously occurs in an extremely small region, and thus needs to be handled by using a change threshold in the conventional annotation display. (2) is automatically changed by the browser in some cases. (3) occurs in a large number of regions on the screen by a mouse passing through the regions. This display change due to the passing of a mouse occurs, in addition to an URL link, a GUI button, a combo box, a scroll bar, a menu, a check box, and the like. (4) is change as update of the length of a scroll bar when the size of display content changes, and frequently occurs in a text editor. This change is not recognized with eyes, and thus the user is unlikely to understand the reason of this annotation update. (5) is change that automatically occurs at an interval unlikely to be noticed by the user. (6) and (7) are used in an intra-net system as well as web contents in some cases.

As described above, annotation update frequently occurs due to change not noticed by the user, and waiting for a calculation time of image matching occurs at each update, which is a problem. In particular, change of highlight display occurs when a mouse passes over a link inside of the browser, but momentarily returns to the original state, and no change occurs to character content. If the region of a character image is specified as a template image, annotation update occurs when movement does not occur from the original position of an icon. According to the present configuration, for change of a small region, update is performed only on a rectangular region surrounding the region, thereby achieving a short calculation time. In addition, when no icon exists in a change rectangle in the previous frame, no search range is set, and no image matching is performed, and thus no display update occurs for change in an unrelated part in many cases.

When small change such as the above-described (1) to (7) and large change such as scrolling of a screen are combined at an optional timing, it is difficult to perform display update on the basis of a difference while preventing a region from being missed or not recognized, but this can be reliably performed according to the present configuration.

However, a difference cannot be reduced only with the configuration described in the embodiment and a sufficient effect cannot be obtained in some cases. For example, when minute change occurs at a separated position while a caret is flashing as illustrated in (1) of FIG. 18, these simultaneous changes are treated as change of a large region surrounding these change places. Similarly, a case in which change occurs simultaneously at a plurality of places, such as a case in which a relevant URL string is displayed in a status bar of (2) when mouse hover of (3) is performed, occurs in many ways depending on the structure of an application. Not so excellent efficiency can be obtained for changes that occur simultaneously at separated places.

However, when change regions are scattered at certain margins, the above-described problem is easily solved by extracting the change regions as a plurality of separate rectangles instead of extracting these change places as one rectangle of the entire window. Specifically, the rectangles of these change regions that occur simultaneously are treated as change regions occurring at different change timings in a pseudo manner, and update processing is repeated for each small rectangle. To achieve this, functions 302 and 303 illustrated in FIG. 14 need to be extended to serve as a function that performs extraction in a plurality of different rectangles, and a function that sequentially passes these rectangles one by one to the definitive update and the provisional update, but any other configuration does not need to be changed. This is achieved by the characteristics that update based on a difference can be calculated in a short time for a small area, and a region is prevented from being missed or not recognized through asynchronously processing of an optional update target.

Start of display update of annotation upon operations such as switching of an active window and movement and resizing of a window is handled as described below. Specifically, the matching position cache is provided for each window. Specifically, for example, a list is stored in a hash map including a window handle and a rule ID as two keys, and a plurality of matching positions are stored in the list. When window switching occurs, content when this window is previously displayed is referred to by using a new window handle as a key. When the movement of the window occurs, the rectangular coordinates of the previous frame in the matching position cache are forcibly shifted by the amount of the movement. When the resizing occurs, the same processing is performed with the amount of the movement of the upper-left corner of the window, and in addition, any matching position out of the boundary of the window is deleted.

The hash map is used as a matching position cache for initial display. This can solve delay until initial display right after window switching, and an intermittent duration until large display update right after positional movement and resizing of a window (the above description is made on the case in which a matching position is stored in screen coordinates, but when the matching position is stored in relative coordinates with respect to the upper-left corner of the window as an origin, the screen coordinates of the origin of the relative coordinates referred to at icon display may be changed instead of forcibly shifting the matching position). In this manner, simple implementation that handles switching, movement, and resizing can be achieved without introducing a new element or behavior to the configuration according to the present invention.

When a cache is simply used by a conventional typical method, the existence and coordinate position of an icon are not accurately obtained in some cases. In the configuration according to the present invention, however, it is reliably guaranteed that the definitive update is executed at any timing after the provisional update, and accurate content is obtained. It is also guaranteed that the existence of an icon is inaccurate in the provisional update, but a positional relation (in the embodiment, a position upon movement in the vertical direction) on a certain condition is accurate.

Then, as described above, the specific configuration and behavior for handling the switching, the movement, and the resizing are same as the problem-solving configuration and behavior in the case of scrolling, thereby providing consistent appearance of display update to the user.

When the above-description is generalized, the method according to the present invention provides high compatibility when another speeding-up method is newly added and combined. A logic of the provisional update based on assumption of scrolling in the vertical direction is used in the embodiment, and can be combined with various methods such as a logic of using a resulting cache when a window is previously active and a logic of using part of a resulting cache right before movement and resizing. In other words, the present embodiment provides a common base when a plurality of methods that each achieve a fast speed with a reduced accuracy are used in combination by referring to a past result.

Introduction of the idea of the provisional update processing suitable for, for example, a characteristic of an image on the desktop screen of a PC and a characteristic of change thereof achieves smooth update upon movement, generation, and deletion of an icon which is important in usage of the annotation system.

Display update processing suitable for requirements unique to annotation, which is based only on past data in a real-time video for which future data cannot be obtained, is achieved by introducing the idea of the provisional update, in which the false negative event in an image matching result is allowed but the false positive event is not allowed, based on the idea of utilizing the previous frame, which is similar to those of inter-frame encoding and motion compensating encoding for example.

A result can be obtained with a smaller amount of calculation due to the effect of providing both the utilization of the previous frame and the difference calculation on a change region. Change of the screen is handled without using a threshold or performing selection based on priority, thereby avoiding a risk of missing a need for update due to minute change.

The second and the third embodiments, in which update processing is activated without the monitoring duration, can achieve a reduced time delay as compared to the first embodiment.

Fourth Embodiment

The first to the third embodiments above describe the method of generating a predetermined region on the basis of the position of an icon displayed on the screen, and performing the provisional update by using the region, but the present invention is not limited thereto. For example, a substitute template may be generated on the basis of matching positional coordinates as a result of calculation on the previous frame by the definitive update processing, and bit map matching using the substitute template may be performed in the provisional update processing.

A fourth embodiment describes a case in which bit map matching is performed using a substitute template in the provisional update processing. A substitute template is not a template image specified as a rule in advance, but is a cutout of a rectangular region of a coordinate position extracted by image matching in the definitive update processing. This substitute template is used as a work template image only in the duration of display update processing.

The bit map matching is not a comparison method, such as zero-mean normalized cross-correlation (ZNCC), of performing template matching on the basis of similarity, but determines and extracts a matching position only when images precisely match with each other through simple bit value comparison. This bit map matching can employ a method of achieving significant speeding-up by excluding cases other than a case of a complete match.

The bit map matching using a substitute template is a speeding-up method with a reduced accuracy. The content of the reduction of the accuracy is such that "false negative" is allowed, in other words, an icon is allowed "to be not displayed at a position at which the icon is to be displayed", and "false positive" is not allowed, in other words, an icon is not allowed "to be displayed at a position at which the icon is not to be displayed".

The configuration of the display control device according to the fourth embodiment is the same as that in FIG. 1 described above, and thus description thereof is omitted, but the content of processing by the display control unit 13b is different. The display control unit 13b executes, depending on change of a screen detected by the detection unit 13a, any one or both of provisional update processing that generates a substitute template image on the basis of matching positional coordinates as a result of calculation on the previous frame displayed on the screen, sets the substitute template image as a comparison target bit map, searches for a region on the screen that matches with the substitute template image, and performs overlay display of an icon in the matched region, and definitive update processing that, irrespective of the substitute template image, searches the screen for a region similar to a specified image template, and performs overlay display of an icon at a position corresponding to the similar region.

Specifically, the display control unit 13b executes the provisional update processing and the definitive update processing in parallel when the detection unit 13a detects change of the screen, and generates, in the provisional update processing, a substitute template image in the next provisional update processing on the basis of matching positional coordinates as a result of calculation on the previous frame in the definitive update processing. In this manner, similarly to the third embodiment, the display control unit 13b according to the fourth embodiment executes the definitive update processing and the provisional update processing in parallel. However, in the third embodiment, the predetermined region is generated on the basis of a set of the coordinate values of a matching position in the previous frame, and in the fourth embodiment, the substitute template is generated on the basis of matching information in the previous frame.

Figure 19:
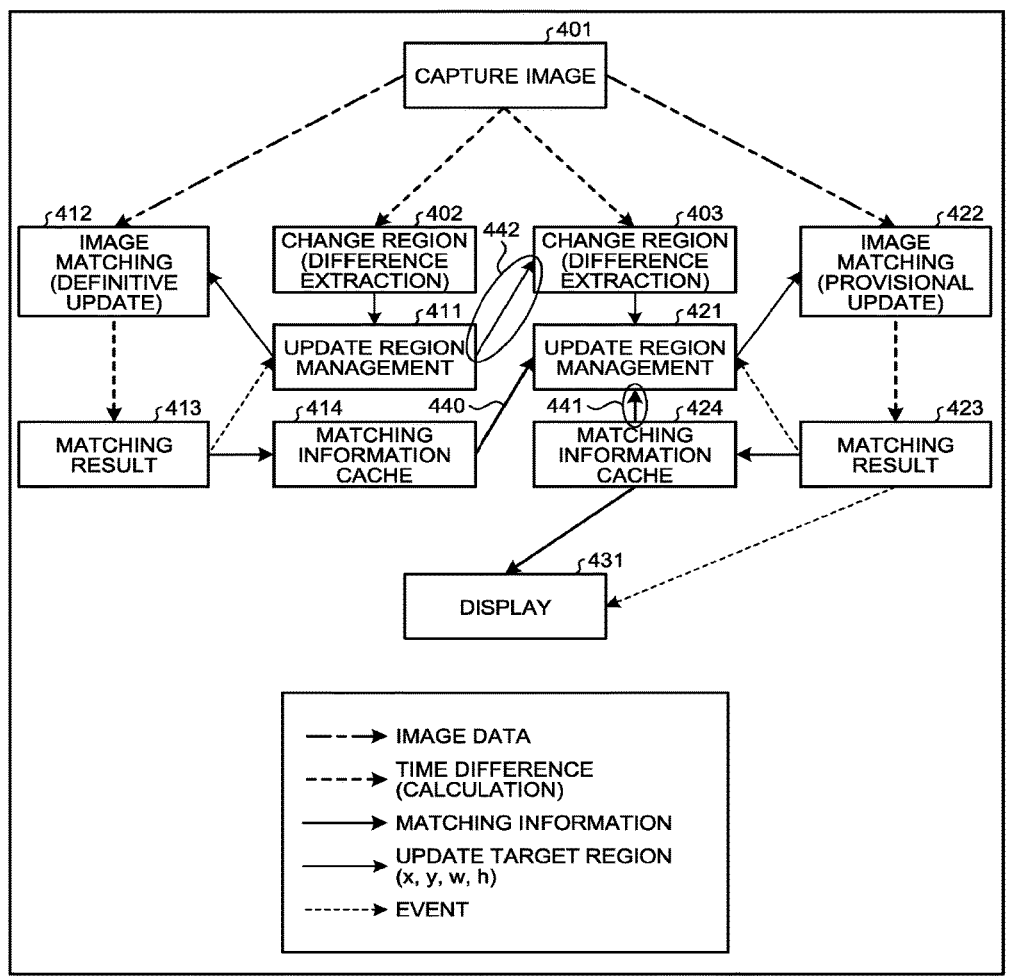
FIG. 19 is a diagram for describing the outline of screen update processing executed by the display control device according to a fourth embodiment, the screen update processing being configured to execute the provisional update processing and the definitive update processing in parallel.

The following describes, with reference to FIG. 19, the outline of screen update processing executed by the display control device according to the fourth embodiment, in which the provisional update processing and the definitive update processing are executed in parallel. FIG. 19 is a diagram for describing the outline of the screen update processing executed by the display control device according to the fourth embodiment, in which the provisional update processing and the definitive update processing are executed in parallel. FIGS. 14 and 19 are different from each other in that information passed through 440 and 441 is a set of the coordinate values of a matching position in the previous frame in the third embodiment, but is the substitute template image instead in the display control device according to the fourth embodiment. However, similarly to the third embodiment, a function 421 needs the coordinate values of a matching position to extract, on the basis of the coordinate values of a rectangular region as a change region (difference extraction) received from a function 403, in-cache information on the range of the region. The coordinate values and the substitute template image are collectively referred to as matching information, and this information is cached.

In the definitive update processing, irrespective of the substitute template image, the display control unit 13b searches for a region for which a matching rate indicating the degree of similarity to a specified image template is a predetermined threshold or larger. Then, the display control unit 13b generates the substitute template image in the next provisional update processing on the basis of matching positional coordinates as a result of calculation on the previous frame in the definitive update processing. Specifically, the display control unit 13b cuts out a rectangular region at the matching positional coordinates as a region similar to the image template, and sets an image of the cut-out region as the substitute template image. Then, in the provisional update processing, the display control unit 13b sets the substitute template image as a comparison target bit map, and searches for a region on the screen that matches with the substitute template image.

Figure 20:
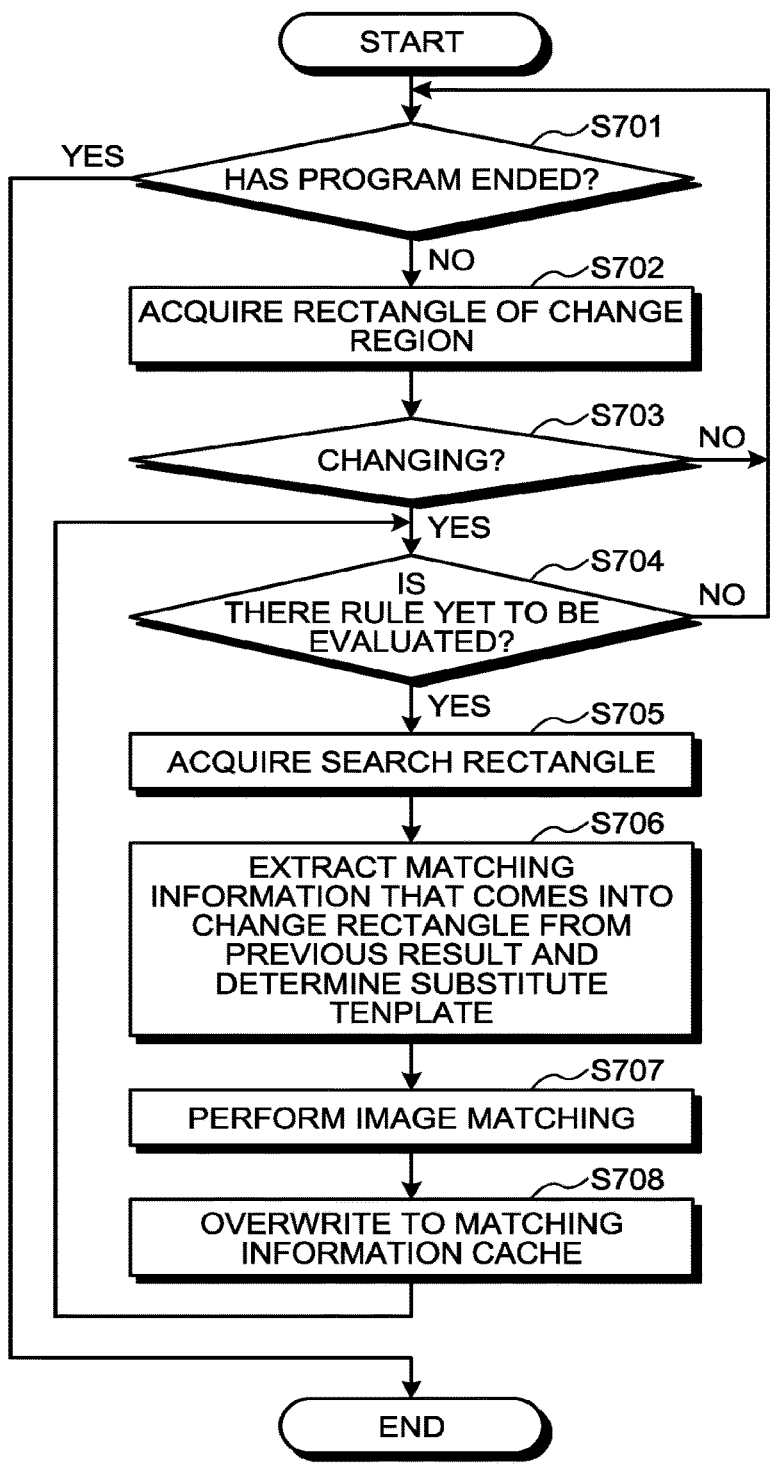
FIG. 20 is a diagram for describing the process of the provisional update processing at the display control device according to the fourth embodiment.

The following describes the process of the provisional update processing at the display control device according to the fourth embodiment with reference to FIG. 20. FIG. 20 is a diagram for describing the process of the provisional update processing at the display control device according to the fourth embodiment. As illustrated in FIG. 20, in the provisional update processing, the display control unit 13b determines a substitute template by extracting matching information included in a change rectangle from a previous result (step S706), and performs image matching (step S707). Thereafter, the display control unit 13b overwrites the matching information to a matching information cache depending on a result of the image matching (step S708). Thereafter, the display control unit 13b returns to step S704, and repeats the processing at steps S704 to S708 as long as there is a rule yet to be evaluated.

Figure 21:
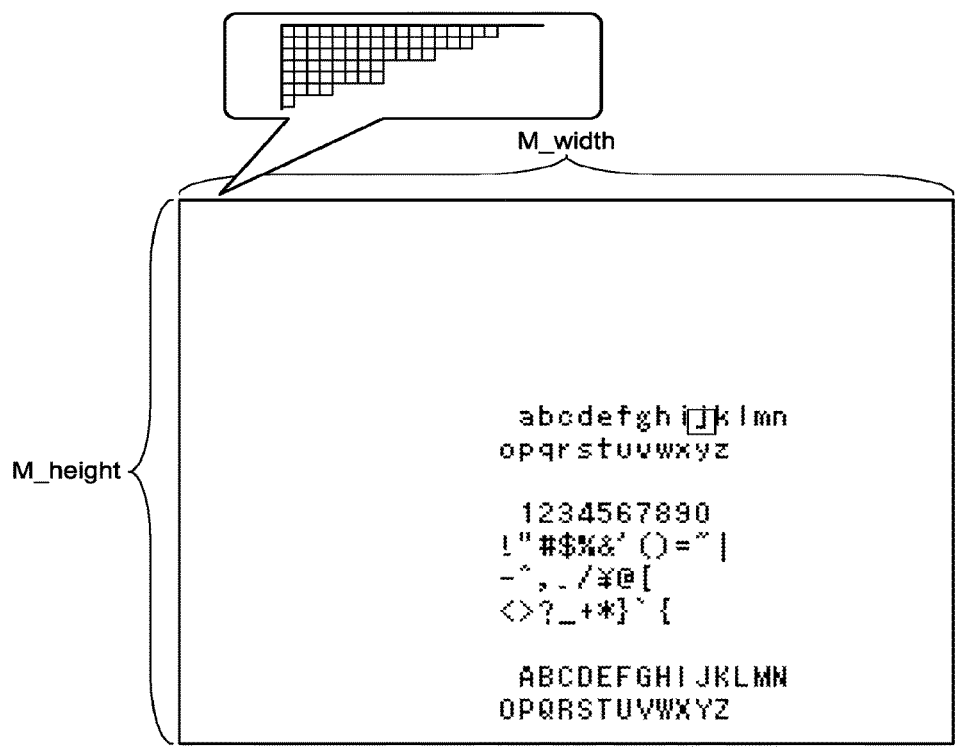
FIG. 21 is a diagram illustrating an exemplary target image.
Figure 22:
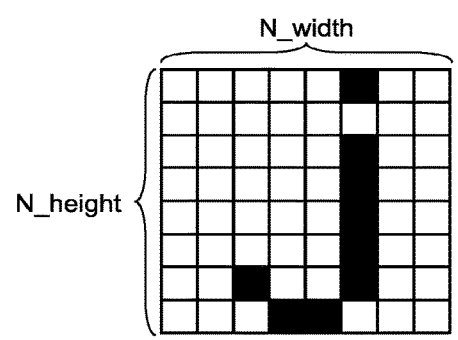
FIG. 22 is a diagram illustrating an exemplary template image.

The following describes processing at the display control device according to the fourth embodiment with reference to a specific case. An exemplary target image as a processing target and an exemplary template image will be described below with reference to FIGS. 21 and 22. FIG. 21 is a diagram illustrating an exemplary target image. FIG. 22 is a diagram illustrating an exemplary template image. As exemplarily illustrated in FIG. 21, the target image is an image having a vertical size of "M_height" and a horizontal size of "M_width", and an alphabet, a number, a symbol, and the like are displayed on the image. As exemplarily illustrated in FIG. 22, the template image is an image having a vertical size of "N_height" and a horizontal size of "N_width", and an alphabet "j" is displayed thereon.

Figure 23:
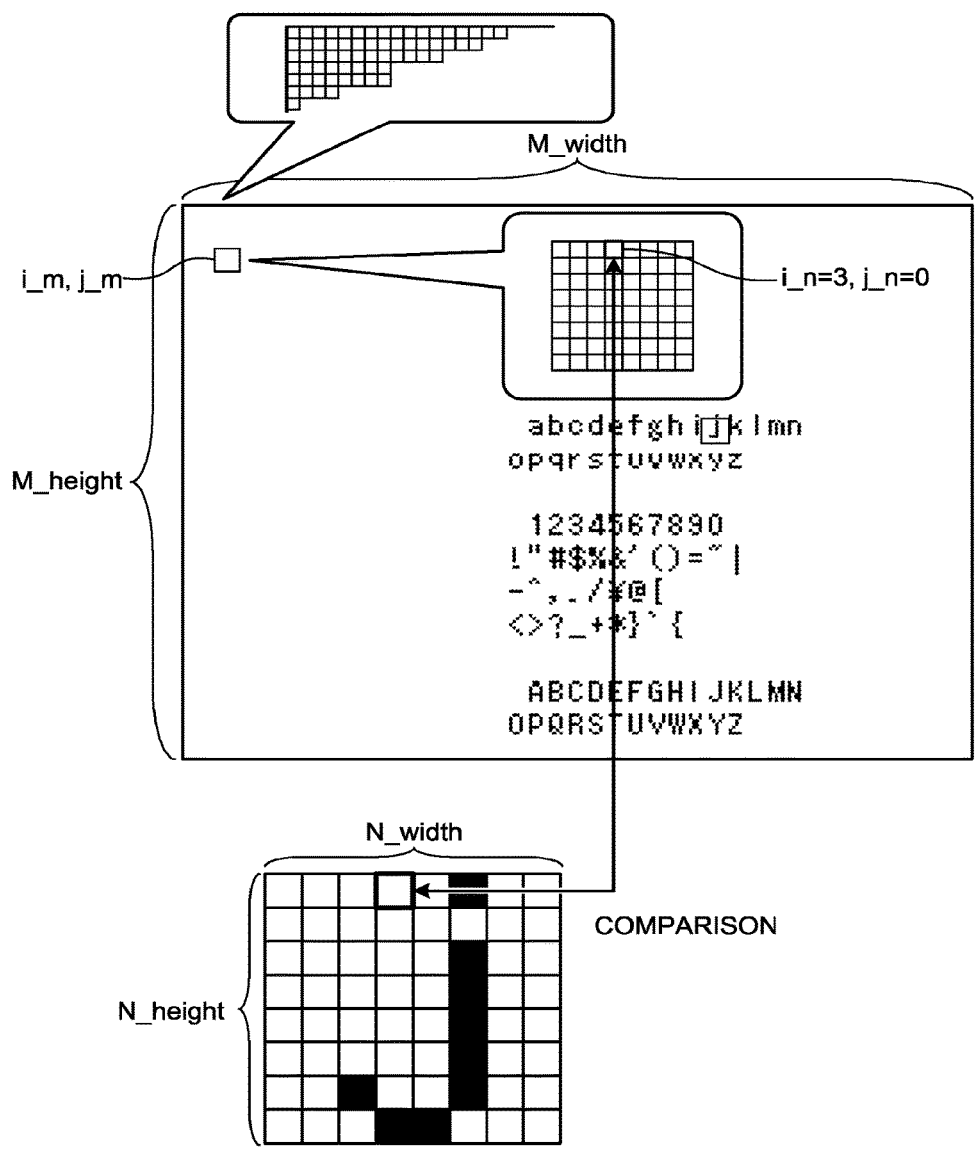
FIG. 23 is a diagram for describing pixel comparison processing.

The following describes, with reference to FIG. 23, pixel comparison processing using the examples illustrated in FIGS. 21 and 22. FIG. 23 is a diagram for describing the pixel comparison processing. The example illustrated in FIG. 23 illustrates a relation of a reference position when simple pixel comparison is performed sequentially from the upper-left pixel of an image. An exemplary pseudo code of a computer program that executes the pixel comparison processing is illustrated in FIG. 24. FIG. 24 is a diagram illustrating an exemplary pseudo code of the computer program that executes the pixel comparison processing.

In the example illustrated in FIG. 23, comparison with a pixel at a position of i_n=3 and j_n=0 in the template image is performed at a matching determination position of i_m and j_m in a blank part of the target image. Pm and Pn referred to in the condition part of an if statement on line 0006 illustrated in FIG. 24 are each an array storing therein a pixel value. As a result of the comparison, if no match is determined, control variables i_n and j_n are updated in the execution part of the if statement on lines 0007 to 0009 so as to leave the loop of line 0004. Thereafter, a boolean variable is referred to on line 0013, and if match determination on line 0006 is true for all Pn, i_m and j_m described above are output as a matching position to be extracted in bit map matching processing. At a situation illustrated in FIG. 23, pixel values of Pm and Pn both represent white and match with each other, and thus an if statement on line 0006 is not executed, but when comparison is performed at a position of i_n=4 and j_n=0 at the next loop execution, Pn of the template image represents black, and thus the execution part of the if statement is executed, and it is determined on line 0013 that no match is determined at this position i_m and j_m, followed by transition to determination for a next position of i_m+1, and j_m.

The following describes a case in which a speeding-up method is applied to the bit map matching. The display control unit 13b determines a predetermined comparison reference position on the screen, and sequentially compares a comparison target pixel at the comparison reference position and a comparison pixel selected among pixels on a bit map of a predetermined substitute template image. In other words, comparison with a representative point is performed. As a result, if no match is determined for at least one pixel value, the display control unit 13b repeats the comparison with a representative point at a next comparison reference position on the screen. If a match is determined for all pixel values in the comparison with a representative point, comparison is performed for all pixels on a bit map of the substitute template image in an optional order. Then, as a result of the comparison for all pixels on the bit map in an optional order, if no match is determined for at least one pixel value, the display control unit 13b repeats the comparison at a next comparison reference position on the screen, and performs overlay display of icons at matching positions as the comparison reference positions on the screen if a match is determined in all comparisons.

Figure 25A:
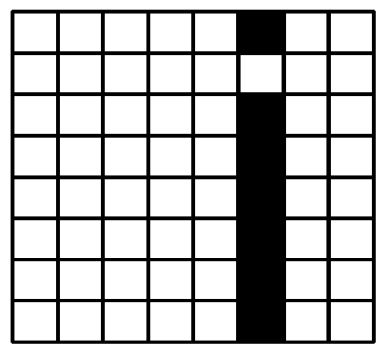
FIG. 25A is a diagram illustrating an exemplary partial image for which false determination is to be made.

For example, as a speeding-up method, the comparison with a representative point is performed right before line 0004 illustrated in FIG. 24. A preferable number of the representative points are selected in a preferable order in advance, and if match determination is made in the comparison with all of these points, cross comparison on line 0004 and the following lines is executed. If no match is determined for at least one pixel value in the comparison with a representative point, a for statement on line 0002 is swiftly continued. With this configuration, a reduced number of times of comparison can be achieved when the target image includes a small amount of blank parts and is occupied with characters as illustrated in FIG. 21. For example, when the image is occupied with a character of "i" in FIG. 25A, for Pn of the template image, an if statement on line 0006 in FIG. 24 is not executed until the comparison proceeds up to i_n=2 and j_n=6 (pixel 2601 in FIG. 26), but when the comparison is performed with this point as the first representative point, the number of times of comparison for all Pm of the target image is slightly larger than M approximately.

Figure 25B:
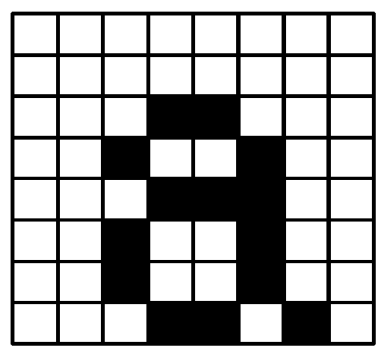
FIG. 25B is a diagram illustrating an exemplary partial image for which false determination is to be made.
Figure 25C:
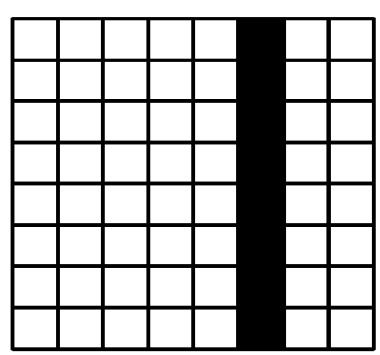
FIG. 25C is a diagram illustrating an exemplary partial image for which false determination is to be made.
Figure 25D:
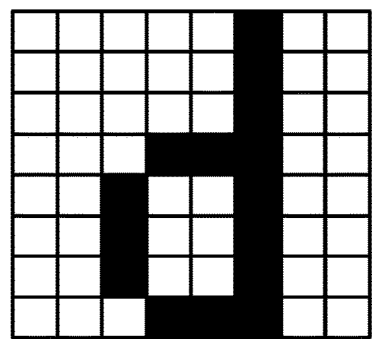
FIG. 25D is a diagram illustrating an exemplary partial image for which false determination is to be made.
Figure 26:
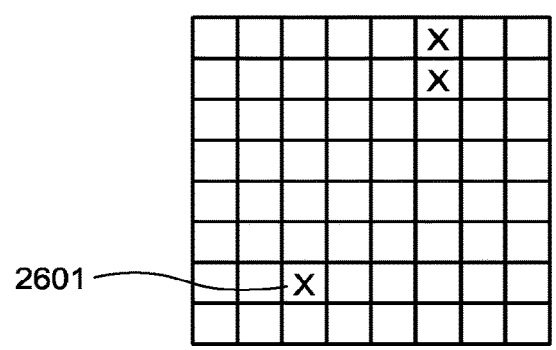
FIG. 26 is a diagram illustrating exemplary selected points in bit map matching processing.

In reality, similar characters such as those illustrated in FIGS. 25B to 25D in addition to "i" needs to be taken into consideration, and for example, a plurality of points such as those indicated as "X" in FIG. 26 need to be selected as differences therebetween and prioritized appropriately. In generalization of the processing of selecting a representative point, the representative point needs to be comprehensively determined also on the basis of other character types and pictures such as icons and figures other than characters. For this purpose, the representative point is extracted, determined, and stored in advance on the basis of the content of an image likely to appear in practical use as well as the probability and tendency of appearance of a pattern, or is dynamically adjusted and optimized through feedback of a real-time determination result during display execution.

Figure 27A:
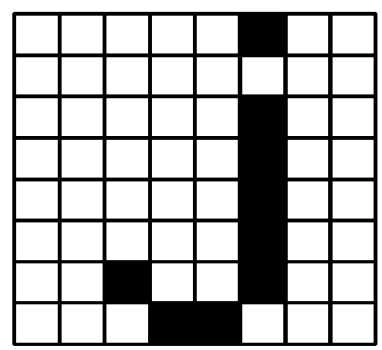
FIG. 27A is a diagram illustrating an exemplary substitute template.

In an actual application scene, like a flashing caret, a screen dynamically changes in some cases. When the caret comes into a template range through the definitive update, the caret can be extracted as a matching place by appropriately adjusting a threshold of the degree of similarity. For example, in a display state in which the caret is not initially displayed, the definitive update processing and the provisional update processing illustrated in FIG. 19 are executed. A function 414 in the definitive update caches a substitute template exemplarily illustrated in FIG. 27A that is a picture same as an image not including the caret, in other words, an original template image. The function 421 in the subsequent provisional update performs bit map matching using the substitute template. Then, the same result, in other words, the substitute template exemplarily illustrated in FIG. 27A that is a picture the same as the original template image is handed over to a function 424 and cached therein.

Figure 27B:
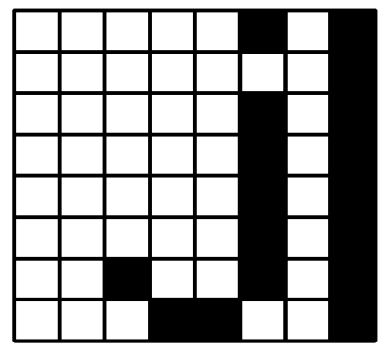
FIG. 27B is a diagram illustrating an exemplary substitute template.

Subsequently, for example, a cursor is moved, and the caret starts flashing next to "j". In the first provisional update for this screen change, a capture image does not match with the substitute template exemplarily illustrated in FIG. 27A, and thus an icon disappears momentarily. In the definitive update executed in parallel through a separate thread, extraction of a matching position is successful because the threshold of the degree of similarity is set to be low, and a substitute template exemplarily illustrated in FIG. 27B is cached by the function 414. In the next provisional update, the substitute template illustrated in FIG. 27A from the function 441, and the substitute templates illustrated in FIGS. 27A and 27B from the function 440 are handed over to the function 421, and thus two sets of bit map matching are executed, so that extraction of a matching position is successful this time, and the icon starts being displayed again. Thereafter, when the caret flashes, two substitute templates are simultaneously applied for this matching place, and thus the icon is continuously displayed without momentarily disappearing through the provisional update.

As described above, when an image at a matching position minutely changes within the range of the threshold, display update similarly to that of the ZNCC can be achieved by storing a plurality of substitute templates for respective states and simultaneously applying bit map matching.

This technology with a substitute template is effective in absorbing a difference at a bit pattern level generated by, for example, anti-aliasing and ClearType as a derivative technology thereof, which have been actively used due to recent improvement of graphic performance and display resolution. Similarly, the present technology is effective for, for example, differences in a rendering engine and a font of a web browser, and differences in color gradation in environmental settings of remote desktop, virtual machining, and the like, which are technological factors that generate a difference at a bit pattern level. These differences are relatively more likely to be generated in a practical use situation, and the present technology is an important component to avoid disadvantage of bit map matching.

When a significantly large number of substitute templates are stored, bit map matching needs to be performed a large number of times, which adversely results in performance degradation. This problem can be solved, for example, by individually storing a substitute template for each set of coordinate values of a matching position in accordance with a past history, or by deleting the oldest substitute template when a certain period of time or longer has elapsed.

In addition, dynamical switching from bit map matching to normal image template matching depending on the number of simultaneously stored substitute templates and the actual degree of contribution of a representative point in bit comparison is applicable as a solution to the above problem.

As described above, bit map matching is performed in round-robin execution in principle and thus requires M×N comparison of bit values in some cases, where M represents the number of pixels of a target image (screen capture image), and N represents the number of pixels of a template image.

However, in reality, when different pixel values are found only at one place, determination for this coordinate position is false, and the process transitions to determination for a next coordinate position, and thus the comparison only needs to be in a number of times smaller than a theoretical value. In addition, in an actual use scene, the size N of a template image is smaller than the size M of a target image, and only several matching positions are on the target image. For example, when a window image of a text editor has a width of M_width=256 dots and a height of M_height=256 dots, the number M of all pixels is M_width*M_height=65536 dots. When the template image has a width of N_width=8 and a height of N_height=8, N=64 dots.

The number of times of simple comparison is M*N=4194304. However, in this case, almost all determination executions are false except for one correct position, and thus the overall processing time can be largely reduced when a matching failure can be found at an early stage among N places in the template image for each of the positions of M places in the target image so that any wasted comparison is omitted.

The following first describes a case in which two bit maps are sequentially compared with each other from the upper-left corners in a simple manner. In this case, the sixth pixel from the upper-left corner of a template image of "j" is black. At least 90% of pixels of a target image are white. When 91 characters are displayed in a window and all solid black, the number of black pixels is 5824=91*64 at maximum. The number of times of comparison for white pixels is 353894=6*65536*0.9, which is reduced to 8.4% approximately.

Figure 25E:
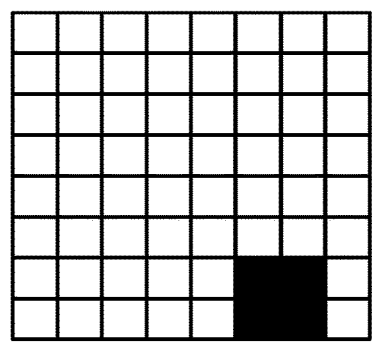
FIG. 25E is a diagram illustrating an exemplary partial image for which false determination is to be made.

This calculation provides a largely different result with a different condition. For example, when a template image has a bit pattern of ". (period)" illustrated in FIG. 25E, the first black pixel is the fifty-fourth pixel in comparison from the upper-left corner. Thus, the number of times of comparison is 75.6% approximately of the original number, which is not so much different from the original number. In this example, reduction of the number of times of comparison equivalent to that of the previous example can be achieved when the comparison is sequentially performed in the opposite direction, in other words, from the lower-right corner. Thus, a suitable comparison order varies depending on the content of the template image. When application to various kinds of patterns is taken into consideration, sequential comparison in a spiral pattern from a central part seems effective, but does not achieve large improvement for a pixel pattern such as "0" or "L" that is white in a central part and black in a peripheral part.

To solve this problem, pixel positions are arranged in advance to represent a characteristic of the template image most depending on a picture while a mutual positional relation can be random irrespective of the regularity of arrangement of pixels. The regularity of arrangement is, for example, continuation in an X direction or a Y direction, or adjacency in four directions or eight directions around. Not all pixels need to be ordered. For example, as illustrated in FIG. 26, a small number of comparison points as representative points may be dispersively arranged. All of N pixels of the template image may be compared for a position on the target image M that cannot be determined to be false through the above-described comparison.

Unlike the case described above, an actual screen capture image includes, for example, an icon and a picture, and thus includes a larger number of pixel values than in a case with the two colors of a background color and a character color. In this case, when a pixel having a characteristic color, for example, a pixel having a color used only in an icon is selected as a representative point, comparison only needs to be made with one point in the template image, thereby achieving a significant reduction in the number of times of comparison.

As described above, as a method of speeding up bit map matching, it is important to optimize selection and order of comparison points so that a pixel having a different value is reached in a small number of times of bit value comparison as possible in a case to be determined to be false. However, an expected significant effect is not necessarily obtained by the above-described technique for a complicate pattern such as a character image including a plurality of characters, or a screen on which characters exists in the entire window with few blank spaces. Technological support of the selection and ordering of comparison points is expected to be possible, but a separate examining evaluation is needed for this.

Depending on an actual application scene, the present method is not to be used when conditions of the target image and the template image are not suitable to provide a sufficient effect. To handle such a situation, for example, feedback is performed during display update to dynamically control the order of comparison, or the present method is switched to another method when the effect is small, and activated only when a significant effect is expected.

In this manner, bit map matching can achieve speeding-up by allowing "false negative" with a reduced accuracy. When used as a display update method, the bit map matching has fluctuation in its effect. For this reason, when supplementarily used with another method, the bit map matching can achieve speeding-up under an appropriate condition while maintaining practical usability.

(Plurality of Generations of Cache)

In the above description of the first embodiment, the example in which a search range is a rectangular region extended in the horizontal direction or the vertical direction. As for this point, for example, depending on an application as an applications target, the extension in the vertical direction may be fixedly specified for an application on which vertical scrolling on a web browser is mainly performed. The extension in the horizontal direction may be fixedly specified for an application on which a lateral table view displaying a data base search result is mainly employed.

Alternatively, in order to support various kinds of display formats of various kinds of applications, the extension may be dynamically switched between the horizontal and vertical directions depending on the content of a displayed target. This requires a configuration for storing a plurality of generations of matching positional coordinates as the matching result information together with a matching calculation time.

Thus, when the detection unit 13a detects change of the screen, the display control unit 13b executes the provisional update processing and the definitive update processing, and in the definitive update processing, generates matching result information on the basis of a result of calculation on the previous frame, and accumulates a plurality of generations of the matching result information in a cache. Then, in the provisional update processing, the display control unit 13b generates predetermined matching result information on the basis of a result of calculation on the previous frame, and accumulates a plurality of generations of the predetermined matching result information in a cache. The provisional update processing may generate a matching condition for the next frame in the provisional update processing by referring to any one or both of the cache used in the definitive update processing and the cache used in the provisional update processing on the basis of the time stamp of the matching result information.

For example, when information is not available for past generations or is available for one or two generations approximately, it is determined that no direction is fixed, and image matching is calculated twice for each of rectangular regions extended in the horizontal and the vertical directions. When information is accumulated for three or more generations, the extension is limited to extension in four directions (north, south, east, and west), which is limited to a particular direction, within most recent several seconds as long as the direction is not inverted. Assuming a small moving amount up to four generations, the search range is limited to a short rectangle extended by a length of 100 pixels approximately, and when more generations of the information is accumulated, a length corresponding to an average moving distance before most recent several seconds is set as a reference. In addition, the search range is limited to a length twice as large as the reference when the moving distance tends to increase, and to a length 0.8 times as large as the reference when the moving distance tends to decrease.

When there is no movement within most recent several tens of seconds after continuous display update stops, the direction and the distance are reset to default values in the next update. When there is no movement within most recent several tens of seconds while continuous display update is performed, only the degree of similarity is checked through image matching without searching by using a minimum rectangle surrounding a matching position as a search range, and only any disappearance of a picture is reflected.

As described above, a dynamic control method can be achieved, in addition to change of the initial value of a parameter and a control amount as appropriate in the example, through deactivation of some control methods, and addition and combination of another control method.

Instead of being stored for each matching position, the matching result information may be stored in categories such as an applied rule type, a target application name, a target window class name, a target process handle, and a target window handle to allow dynamical feedback of, for example, the tendency of rules of the same kind, the tendency of each application type therein, and the tendency of each application instance therein. The matching result information may be stored on a PC that displays the screen, over an activated duration and a deactivated duration of the annotation system. Alternatively, the matching result information may be categorized for each piece of information specifying an activated PC or information specifying a user, and may be stored in a server capable of communicating. For example, control in organized usage in a network environment can be adjusted by storing the matching result information for each of a plurality of PCs, each of a plurality of users, and each category. This may be achieved by applying achievement of, for example, the conventional big data analysis.

(System Configuration or the Like)

Components of devices illustrated in each drawing represent functional concepts and do not necessarily need to be physically configured as illustrated in the drawing. In other words, specific distribution and integration of the devices are not limited to those illustrated in the drawing, but all or part thereof may be functionally or physically distributed and integrated in arbitrary units in accordance with various kinds of loads, use conditions, and the like. In addition, all or an optional part of processing functions performed by the devices may be achieved by a CPU and a computer program analyzed and executed by this CPU, or may be achieved as wired logic hardware. For example, the detection unit $13a$ and the display control unit $13b$ may be integrated.

Among the pieces of processing described in the first embodiment and the modifications thereof, all or some of the pieces of processing described as automatically performed processing may be manually performed, or all or some of the pieces of processing described as manually performed processing may be automatically performed by a well-known method. In addition, information including processing procedures, control procedures, specific names, various kinds of data and parameters described in the above specification and drawings may be optionally changed unless otherwise stated.

(Computer Program)

A computer program in which processing executed by the display control device 10 according to the above-described embodiments is described in a computer-executable language may be produced. In this case, effects similarly to as those the above-described embodiments can be obtained by the computer executing the computer program. In addition, the computer program may be recorded in a computer-readable recording medium, and processing similarly to the above-described embodiments may be achieved by the computer reading and executing the computer program recorded in the recording medium. The following describes an exemplary computer configured to execute a display control program that achieves functions similarly to those of the display control device 10.

Figure 28:
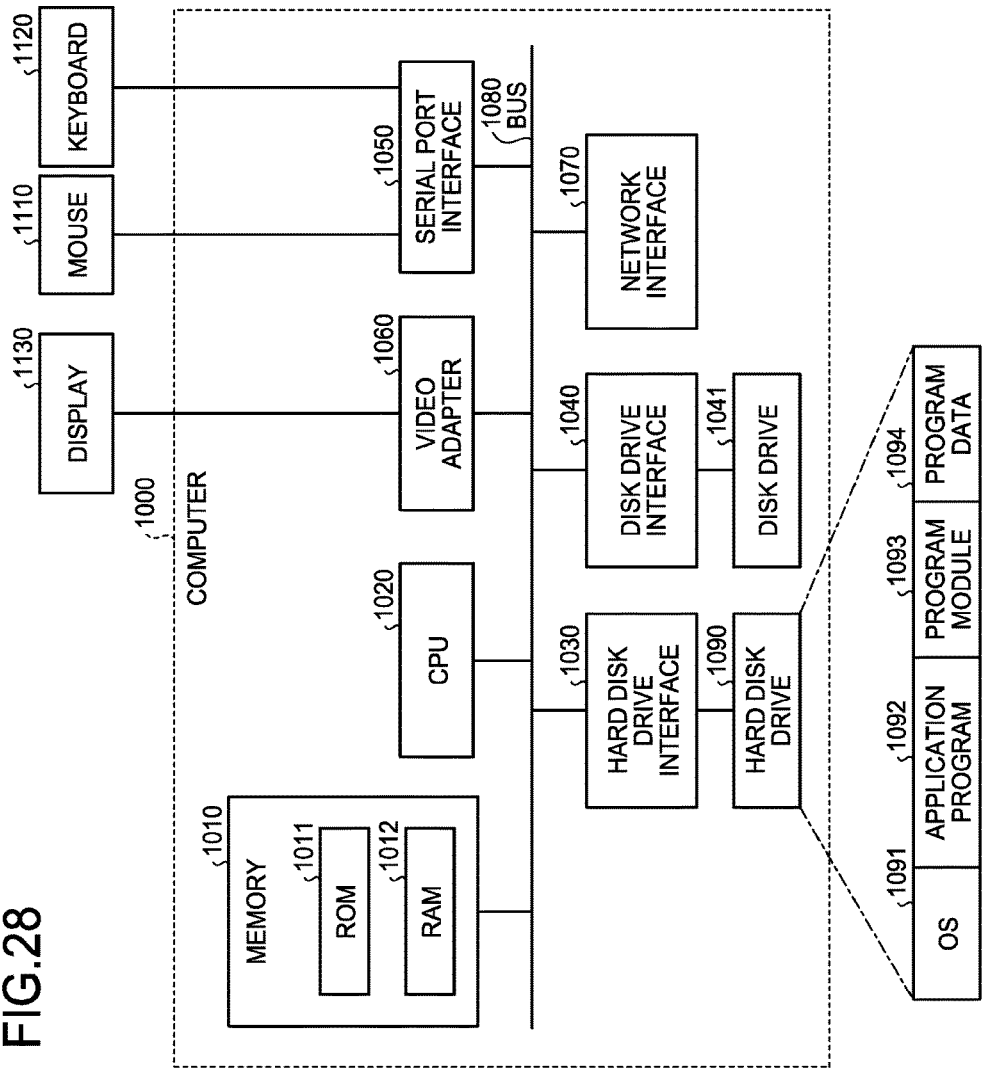
FIG. 28 is a diagram illustrating a computer configured to execute a display control program.

FIG. 28 is a diagram illustrating a computer configured to execute a display control program. As illustrated in FIG. 28, this computer 1000 includes, for example, a memory 1010, a CPU 1020, a hard disk drive interface 1030, a disk drive interface 1040, a serial port interface 1050, a video adapter 1060, and a network interface 1070. These components are connected with each other through a bus 1080.

The memory 1010 includes a read only memory (ROM) 1011 and a random access memory (RAM) 1012. The ROM 1011 stores therein, for example, a boot program such as a basic input output system (BIOS). The hard disk drive interface 1030 is connected with a hard disk drive 1090. The disk drive interface 1040 is connected with a disk drive 1041. For example, a detachable storage medium such as a magnetic disk or an optical disk is inserted into the disk drive 1041. The serial port interface 1050 is connected with, for example, a mouse 1110 and a keyboard 1120. The video adapter 1060 is connected with, for example, a display 1130.

As illustrated in FIG. 28, the hard disk drive 1090 stores therein, for example, an OS 1091, an application program 1092, a program module 1093, and program data 1094. Each table described in the above-described embodiments is stored in, for example, the hard disk drive 1090 or the memory 1010.

The display control program is stored in the hard disk drive 1090, for example, as a program module in which a command executed by the computer 1000 is described. Specifically, the hard disk drive 1090 stores therein a program module in which each processing executed by the display control device 10 described in the above-described embodiments is described.

Data used for information processing by the display control program is stored in, for example, the hard disk drive 1090 as program data. Then, the CPU 1020 loads, onto the RAM 1012 as necessary, the program module 1093 and the program data 1094 stored in the hard disk drive 1090, and executes each procedure described above.

The program module 1093 and the program data 1094 according to the display control program are not limited to storage in the hard disk drive 1090, but may be stored in, for example, a detachable storage medium and read by the CPU 1020 through the disk drive 1041 or the like. Alternatively, the program module 1093 and the program data 1094 according to the display control program may be stored in another computer connected through a network such as a local area network (LAN) or a wide area network (WAN), and may be read by the CPU 1020 through the network interface 1070.

REFERENCE SIGNS LIST 10 display control device
11 input unit
12 output unit
13 control unit
13a detection unit
13b display control unit
14 storage unit
14a annotation DB

The invention claimed is:

1. A display control device comprising:
processing circuitry configured to
detect change of a screen; and
execute, depending on change of the screen detected, both of (i) provisional update processing that generates predetermined matching result information based on a result of calculation on a previous frame displayed on the screen, searches the screen for a region similar to a specified image template by using the predetermined matching result information as part of a matching condition for a next frame, and performs overlay display of an icon in the similar region, and (ii) definitive update processing that searches for a region similar to the image template by using a matching condition larger than the predetermined matching result information, and performs overlay display of an icon at a position corresponding to the similar region,
wherein the processing circuitry detects progress of a change event of the screen,
the processing circuitry is further configured to execute the provisional update processing and the definitive update processing in parallel when the processing circuitry detects the change of the screen and during the progress of the change event of the screen, and
in the provisional update processing, the matching result information is generated in next provisional update processing based on a position at which the icon is displayed in previous provisional update processing already executed and a result of calculation on the previous frame in the definitive update processing.

2. The display control device according to claim 1, wherein the processing circuitry executes, depending on change of the screen detected both of provisional update processing that generates a predetermined region based on the position of the icon displayed on the screen, searches the screen for a region similar to a specified image template by using the predetermined region as a search range, and performs overlay display of an icon in the similar region, and definitive update processing that searches for a region similar to the image template by using a region larger than the predetermined region as a search range, and performs overlay display of an icon at a position corresponding to the similar region.

3. The display control device according to claim 1, wherein the processing circuitry executes, depending on change of the screen detected, both of provisional update processing that generates a predetermined substitute template image based on matching positional coordinates as a result of calculation on the previous frame displayed on the screen, sets the predetermined substitute template image as a comparison target bit map, searches the screen for a region that matches with the predetermined substitute template image, and performs overlay display of an icon in the matched region, and definitive update processing that, irrespective of the predetermined substitute template image, searches the screen for a region similar to a specified image template, and performs overlay display of an icon at a position corresponding to the similar region.

4. The display control device according to claim 1, wherein the processing circuitry extracts a difference region of an image displayed on the screen between frames, searches the screen for a region similar to a specified image template by using the difference region as a search region, and performs overlay display of an icon in the similar region in the definitive update processing; and extracts the difference region, adds the difference region extracted in the definitive update processing to the extracted difference region, searches the screen for a region similar to a specified image template by using the added difference region as a search region, and performs overlay display of an icon in the similar region in the provisional update processing.

5. The display control device according to claim 3, wherein the processing circuitry determines a predetermined comparison reference position on the screen, sequentially compares a comparison target pixel at the comparison reference position with a comparison pixel selected as a representative point among pixels on a bit map of the predetermined substitute template image, repeats the comparison at a next comparison reference position on the screen when no match is determined for at least one pixel value, performs comparison with all pixels on a bit map of the substitute template image when a match is determined for all pixel values selected as representative points, repeats the comparison at a next comparison reference position on the screen when no match is determined for at least one pixel value as a result of the comparison with all pixels on the bit map in the optional order, and performs overlay display of the icon at a matching position as the comparison reference position on the screen when a match is determined in the comparison with all pixels.

6. The display control device according to claim 1, wherein
in the definitive update processing, the processing circuitry generates predetermined matching result information based on a result of calculation on the previous frame, and accumulates a plurality of generations of the predetermined matching result information in a cache,
in the provisional update processing, the processing circuitry generates predetermined matching result information based on a result of calculation on the previous frame, and accumulates a plurality of generations of the predetermined matching result information in a cache, and
in the provisional update processing, the processing circuitry generates a matching condition for the next frame in the provisional update processing by referring to any one or both of the cache used in the definitive update processing and the cache used in the provisional update processing based on a time stamp of the matching result information.

7. The display control device according to claim 6, wherein, in the cache used in the definitive update processing and the cache used in the provisional update processing, the matching result information is stored in an information processing device that displays the screen, over an activated duration and a deactivated duration.

8. The display control device according to claim 6, wherein, in the cache used in the definitive update processing and the cache used in the provisional update processing, the matching result information is categorized for each piece of information specifying an activated information processing device or information specifying a user, and is stored in a server capable of communicating.

9. A display control method executed by a display control device, the display control method comprising:
    a detection process of detecting change of a screen; and
        a display control process of, depending on the change of the screen detected at the detection process, executing both of provisional update processing that generates predetermined matching result information based on a result of calculation on a previous frame displayed on the screen, searches the screen for a region similar to a specified image template by using the predetermined matching result information as part of a matching condition for a next frame, and performs overlay display of an icon in the similar region, and definitive update processing that searches for a region similar to the image template by using a matching condition larger than the predetermined matching result information, and performs overlay display of an icon at a position corresponding to the similar region,
    wherein the method further includes
        detecting progress of a change event of the screen,
        executing the provisional update processing and the definitive update processing in parallel when the change of the screen is detected and during the progress of the change event of the screen, and
        in the provisional update processing, the matching result information is generated in next provisional update processing based on a position at which the icon is displayed in previous provisional update processing already executed and a result of calculation on the previous frame in the definitive update processing.

10. A non-transitory computer readable medium that stores a display control program configured to cause a computer to execute:
    a detection step of detecting change of a screen; and
        a display control step of executing, depending on the change of the screen detected at the detection step, both of provisional update processing that generates predetermined matching result information based on a result of calculation on a previous frame displayed on the screen, searches the screen for a region similar to a specified image template by using the predetermined matching result information as part of a matching condition for a next frame, and performs overlay display of an icon in the similar region, and definitive update processing that searches for a region similar to the image template by using a matching condition larger than the predetermined matching result information, and performs overlay display of an icon at a position corresponding to the similar region,
    wherein the method further includes
        detecting progress of a change event of the screen,
        executing the provisional update processing and the definitive update processing in parallel when the change of the screen is detected and during the progress of the change event of the screen, and
        in the provisional update processing, the matching result information is generated in next provisional update processing based on a position at which the icon is displayed in previous provisional update processing already executed and a result of calculation on the previous frame in the definitive update processing.

\* \* \* \* \*